(12) United States Patent
Andreyko et al.

(10) Patent No.: US 7,950,029 B2
(45) Date of Patent: May 24, 2011

(54) METHOD FOR INTERACTIVE TELEVISION USING FOVEAL PROPERTIES OF THE EYES OF INDIVIDUAL AND GROUPED USERS AND FOR PROTECTING VIDEO INFORMATION AGAINST THE UNAUTHORIZED ACCESS, DISSEMINATION AND USE THEREOF

(76) Inventors: Aleksandr Ivanovich Andreyko, Moskovskoy oblasti (RU); Andrey Olegovich Kostrikin, Moscow (RU)

( * ) Notice: Subject to any disclaimer, the term of this patent is extended or adjusted under 35 U.S.C. 154(b) by 1217 days.

(21) Appl. No.: 10/502,302

(22) PCT Filed: Jan. 24, 2003

(86) PCT No.: PCT/RU03/00017
§ 371 (c)(1),
(2), (4) Date: Jul. 20, 2004

(87) PCT Pub. No.: WO03/063470
PCT Pub. Date: Jul. 31, 2003

(65) Prior Publication Data
US 2005/0073576 A1 Apr. 7, 2005

(30) Foreign Application Priority Data
Jan. 25, 2002 (RU) .............................. 2002101673

(51) Int. Cl.
- H04N 60/33 (2006.01)
- G06K 9/00 (2006.01)
- H04N 7/12 (2006.01)
- H04N 11/02 (2006.01)
- H04N 11/04 (2006.01)
- H04N 5/68 (2006.01)

(52) U.S. Cl. ............... 725/10; 382/118; 375/240.08; 375/240.1; 348/377; 348/379; 348/380

(58) Field of Classification Search .............. 725/9, 10, 725/12; 382/118; 375/240.08, 240.1; 348/377–382
See application file for complete search history.

(56) References Cited

U.S. PATENT DOCUMENTS

| | | |
|---|---|---|
| 3,507,988 A | 4/1970 | Holmes |
| 4,028,725 A | 6/1977 | Lewis |
| 4,348,186 A | 9/1982 | Harvey et al. |
| 4,397,531 A | 8/1983 | Lees |
| 4,405,943 A | 9/1983 | Kanaly |
| 4,479,784 A | 10/1984 | Mallinson et al. |
| 4,513,317 A | 4/1985 | Ruoff |
| 4,634,384 A | 1/1987 | Neves et al. |
| 4,720,189 A | 1/1988 | Heynen et al. |
| 4,729,652 A | 3/1988 | Effert |
| 4,859,050 A | 8/1989 | Borah et al. |
| 4,946,271 A | 8/1990 | Pålsgård et al. |
| 4,973,149 A | 11/1990 | Hutchinson |
| 5,071,209 A | 12/1991 | Chang et al. |
| 5,430,505 A | 7/1995 | Katz |
| 5,583,795 A | 12/1996 | Smyth |
| 5,649,061 A | 7/1997 | Smyth |
| 5,808,589 A | 9/1998 | Fergason |

(Continued)

*Primary Examiner* — Joseph G Ustaris
(74) *Attorney, Agent, or Firm* — Aleksandr Smushkovich

(57) ABSTRACT

A method of interactive television providing for generating, transforming or displaying video information taking into account individual peculiarities of the user's eye and individual peculiarities of a group of viewer's eyes. The method provides simultaneously all or, at least, two operations from the above operations of formation, conversion and transmission of video signal and display of video information perceptible on the screen of information display facilities for one and/or a group of users or an unrestricted group of users. This is accomplished by one or a combination of various video editing and transmission adjustment techniques.

14 Claims, 14 Drawing Sheets

U.S. PATENT DOCUMENTS

Figure 1:
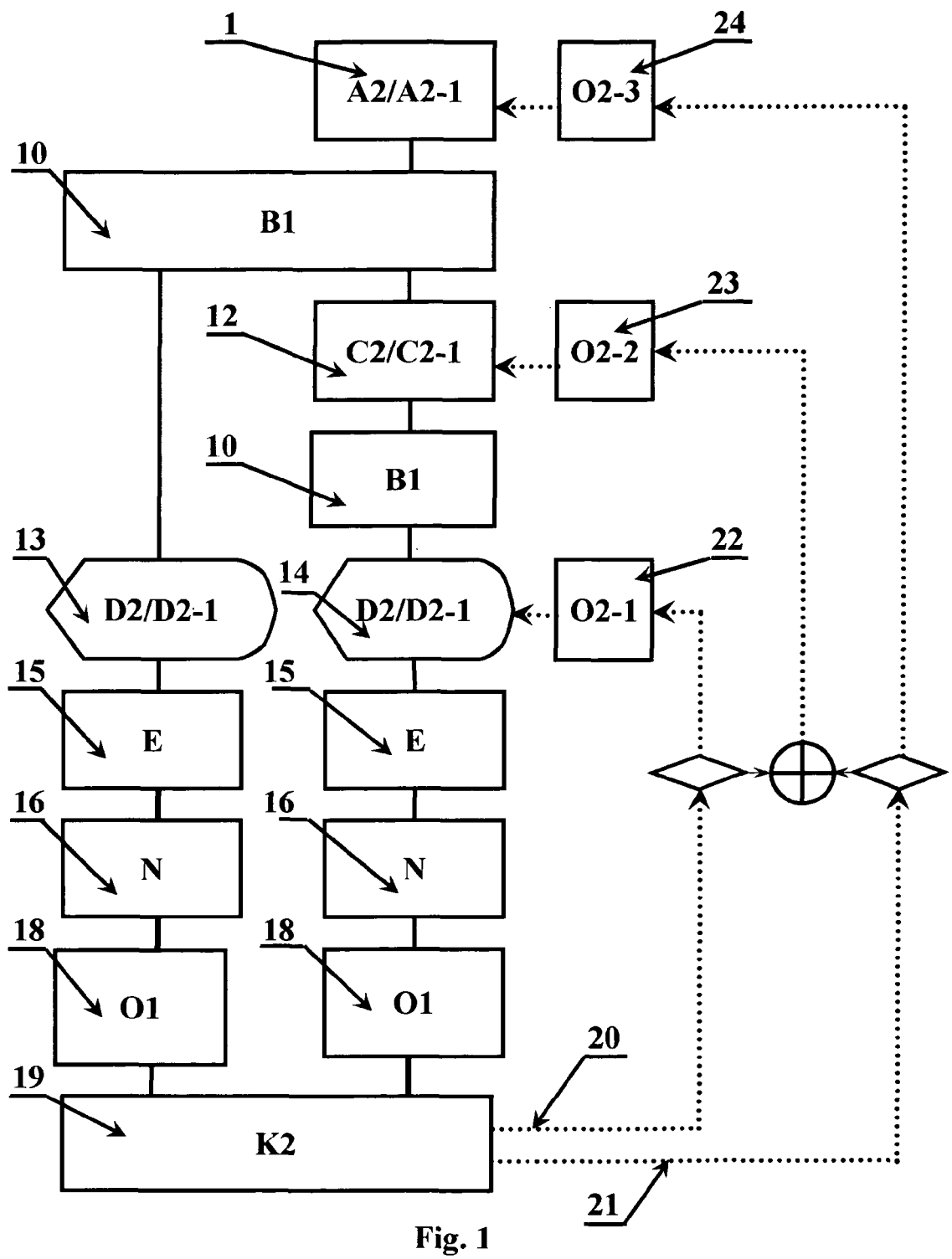

| | | | |
|---|---|---|---|
| 5,894,327 A * | 4/1999 | Griepentrog | 348/379 |
| 5,901,249 A * | 5/1999 | Ito | 382/239 |
| 5,980,044 A | 11/1999 | Cannon et al. | |
| 6,389,169 B1 * | 5/2002 | Stark et al. | 382/225 |
| 6,400,392 B1 * | 6/2002 | Yamaguchi et al. | 348/14.12 |
| 6,490,319 B1 * | 12/2002 | Yang | 375/240.03 |
| 6,937,773 B1 * | 8/2005 | Nozawa et al. | 382/243 |
| 7,027,655 B2 * | 4/2006 | Keeney et al. | 382/239 |

* cited by examiner

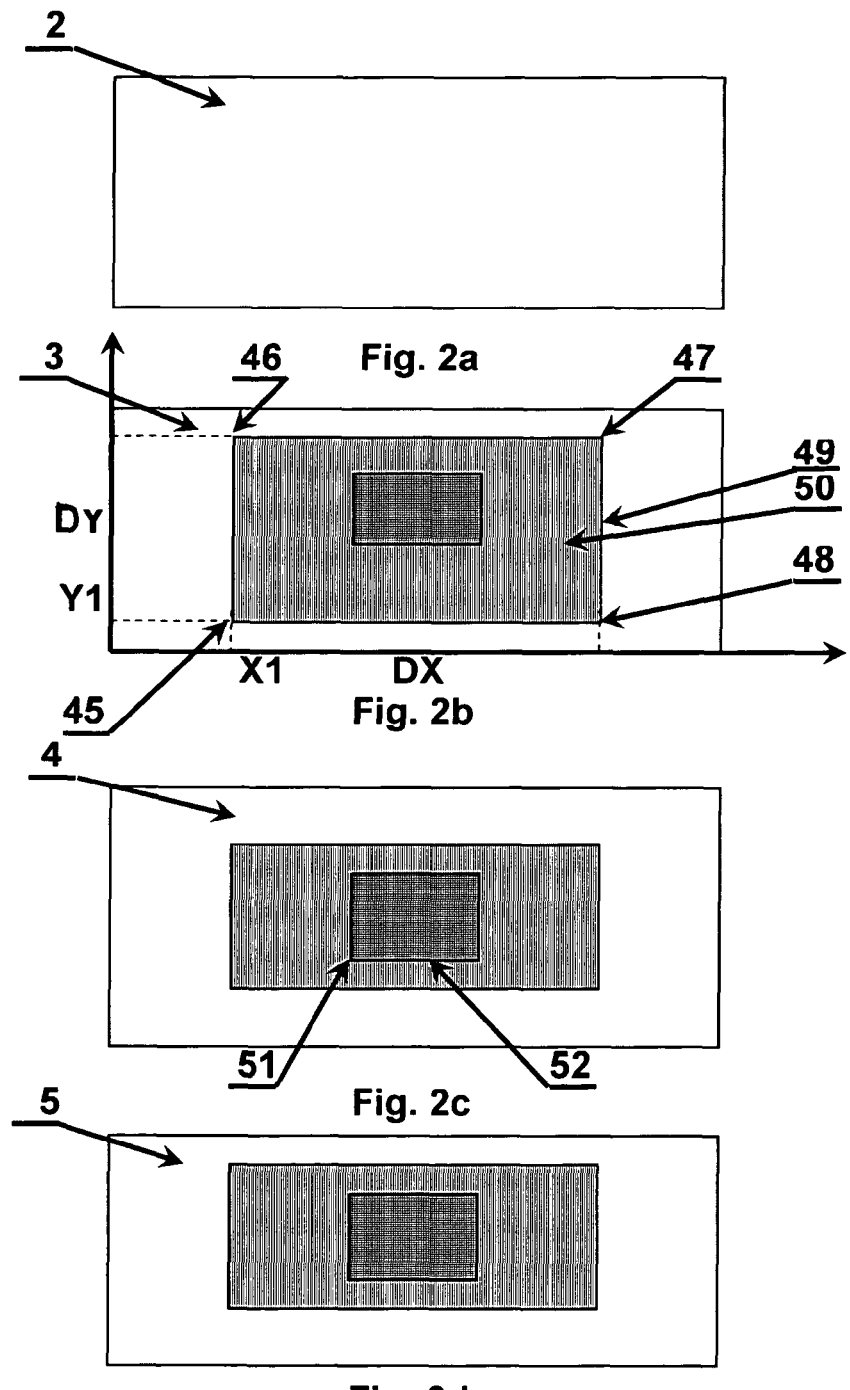
Fig. 2a
Fig. 2b
Fig. 2c
Fig. 2d
 lowest quality level
 first extended quality level
 second extended quality level

METHOD FOR INTERACTIVE TELEVISION USING FOVEAL PROPERTIES OF THE EYES OF INDIVIDUAL AND GROUPED USERS AND FOR PROTECTING VIDEO INFORMATION AGAINST THE UNAUTHORIZED ACCESS, DISSEMINATION AND USE THEREOF

BACKGROUND OF THE INVENTION

1. Fields of the Invention

The invention belongs to the fields of radio electronics, communications, information technology, television, interactive television, industrial and medical television, videophone and videoconferencing.

2. Art of the Invention

Interactive television features an operation sequence designed to form a video image corresponding to expectations of the users. The interactive television combines the following operations:

a) video signal preconditioning and formation,
    b) transmission of the video signals,
    c) conversion of the video signals,
    d) video imaging by means of display components,
    e) formation of interrogation signals for the data formation, conversion and/or display components.

Eye foveal properties are used for reducing an excessive video image by way of reduction of the spatial, color resolution characteristic of the video image or its parts, as well as by using the resolution characteristic versus the time of displaying the image to the user according to the function of his eye resolution.

The eye faculties are widely studied in medicine and are described as the function of the eye resolution threshold. They are used for the diagnostics of eye and the entire body diseases. Development of sensor technique level and identification of the eye dynamic characteristics for the time being in IPC A61B 3/14 class is represented by a variety of devices and methods for determining: coordinates and orientation of the user's eye, their accommodation, eye apple diameter and eye winking factor (invention of the USSR No. 145303, 1960, the U.S. Pat. Nos. 3,507,988, 1970, 4,397,531, 4,720,189, 4,729, 652, 4,946,271, 4,973,149, 5,430,505, 5,583,795, 5,649,061), which are used for a while only in aviation and in the military technology.

Eye dynamic characteristics comprise coordinates and directions of eye optic axes, accommodation, convergence, eye apple diameter and other characteristics. The eye static characteristics comprise long-time characteristics associated with eye individual features (shortsightedness, astigmatism, daltonism, etc.) and affecting the function of the eye spatial, time and color resolution threshold versus the azimuth and elevation angles with respect to the eye optic axes.

Analogues describe proposals for using spatial resolution dependences of the azimuth and elevation angles of video image area relative to the eye optical axis in the facilities of the formation, conversion and transmission of video signals, as well as in the information display facilities.

Thus, patent of the U.S. Pat. No. 4,028,725 "High-resolution vision system" proposes the facility, which consists of the facilities of video signal formation presented as sensitive-to-image sensors (TV cameras) and information display facility presented as a display mounted on the user's head. This facility uses eye faculty, which reduces spatial resolution of the video image formed on the screen of the users' video display facility from the line of vision to the sight periphery. This function is realized by the facilities of video signal formation consisting of two TV cameras with a wide and a narrow fields of vision. Video signals of high and low spatial resolution are formed in a TV camera with a double concentric field of vision. Video signals are transmitted via data channels to the video display facility provided with two cathode-ray tubes, which jointly with the optical system generate the video image: wide—with low resolution and narrow images—with high resolution. An optical servo-operated mechanism coalesces these two images and dynamically co-locates the image center of high resolution with the optical axis of the user's eye. The optical servo-operated mechanism contains an optical sensor, using for determining the dynamic sense of the user's eye optical axis and generating control signals coding the sense of the eye optical axis. The above signals are fed via the data channel to the TV cameras, which according to the interrogation signal modify the orientation of the optical axis of the TV camera of high resolution. In such a way, the user's eye always looks at image of high resolution in the display screen. The device allows using a binocular mode. It also allows using a computer inputs connected to the display or from, sensors or using videotape. This solution permits to process the image presented for one user.

U.S. Pat. No. 4,348,186 "Pilot helmet mounted CIG display with eye coupled area of interest" is interesting by the fact, that it measures the user's head and eye position using head-mounted facilities of formation of high resolution video image, makes a projection of the sector of high resolution video image to cockpit canopy and reflects its motion. The proposed facility fits only for individual usage, because it operates determining one eye area of interest. In the simulator, proposed by the American authors, it is offered to form video image sectors as a series of concentric rings of different ranking such as to present more in detail sectors of central rings, than periphery rings, i.e. with radial reduction of the spatial resolution.

U.S. Pat. No. 4,479,784 "Momentary visual image apparatus" further develops the ideas of U.S. Pat. No. 4,348,186. The above technical solution differs in that the coordinates of the line of eye vision are used for the dynamic determination of the foveal field size of the eye high resolution, with the creation and shift of this area of video image sectors with high quality level on the screen, which occurs faster than saccadic eye movements. It is also proposed to synchronize facilities of image display of low resolution with facilities of projection of high-resolution image by the azimuth and elevation angles. According to one of the proposed variants it is proposed to mount the eye position sensor on the helmet.

In this patent it is proposed to provide an electronic fusion of the image sectors of two resolutions. The difference between the facility and the system consists in the fact that the boundaries of the image sectors are not subject to the dynamic adjustment, but only may be shifted from one vision point to another vision point with a high speed. The size of sectors is assigned by the projection facilities of high-resolution images to place the projection of the foveal area into the image of high resolution, whereas the facilities of low resolution generate the image, which surrounds the above image of high resolution.

The distinctive feature of the above invention consists in the availability of only two sectors with different resolution. At that, the boundaries of the sectors do not modify the form, and every sector features permanent resolution.

U.S. Pat. No. 4,634,384 "Head and/or eye tracked optically blended display system" describes the design of the display generating an image with the resolution corresponding to the spatial position of foveal area of the observer's eye.

The above system and the U.S. Pat. No. 5,808,589 "Optical system for a head-mounted display combining high and low resolution images" has only two areas. The boundaries of these areas are constant respectively, the field of its application is very narrow—flight simulators with dome-shaped screens.

U.S. Pat. No. 5,808,589 and other similar devices helmet-mounted information display facilities, where the image is formed for each eye separately. The sectors of low- and high-resolution images are combined in a device by using a single a facility. The above device is provided with two displays: with high and low resolution, accordingly, and the optical system, generating the single image consisting of the sectors with different resolution and permanent boundary between them. The proposed boundary should correspond to the projection boundary of the foveal field of the eye retina to the screen.

U.S. Pat. No. 5,980,044 "Area of interest display system with image combining using error dithering" developing U.S. Pat. No. 5,326,266 provides a two-display system of low and high resolution, as well as the facilities of their combination, in particular, the methods of combining two images. In this connection, it is proposed to take into account the current position of the user's eyes.

U.S. Pat. No. 4,513,317 "Retinally stabilized differential resolution television display" proposes to use eye foveal faculty in the TV-display creating two zones in the screen: with high and low resolution in image sector raster scanning. The facility is furnished with a special video camera generating two sectors of high and low-resolution image with their mutual positioning depending on the eye position. In this connection, the best ray of the cathode-ray tube determines the high resolution capacity and vice versa, the worst ray of the cathode-ray tube determines the lowest resolution.

The disadvantage of this method consists in the impossibility of its use for long distances and/or for several users simultaneously.

Eye foveal faculty is also used for the reduction of the bandwidth of the video information channel, for example in the U.S. Pat. No. 4,405,943 "Low bandwidth closed loop imagery control and communication system for remotely piloted vehicle". The system is designed for the reduction of the bandwidth in the "closed video line" and the communication system for the control of a remotely flight vehicle.

The devices consists of two parts:
  a remote part comprising a digital camera, video memory, receiver and video memory reader with different resolution; and
  a local part comprising facilities for interrogation signal generation and facility of the above data transmission to the unpiloted flight vehicle.

All these facilities and methods are characterized by the individual nature of their use in aircraft simulators, systems of industrial or military purpose. Absolute majority of the considered technical concepts are designed for the service of one eye of the user, in rare cases—two eyes of one user. Anyway, the application a priori presumes, that the distance from the source of video information to the user will be minimized. It is restricted by the period of the data signal transmission via the data channels from the user to the source of video information and vice versa. It should be smaller than the period of the eye optical axis shift from one pixel to the other pixel of the video frame perceived by the user. Otherwise, video image defects will be observed at the boundary of the video image sectors at the turn of the user's eye optical axis. An on-line communication line should be organized for the transmission of interrogation signals coming from the information display facility to the source of video information.

To prevent the degradation of visual perception of video image because of spotting the boundary effects with the user's eye, some patents, e.g., U.S. Pat. No. 5,071,209 "Variable resolution nonlinear projection system" proposes to abandon distinct boundaries of video image, and instead of this to create the image with gradually variable pixels, the size of each of which corresponds to the dependence function of the eye resolution. In case of the fast eye movement any defects at the boundary between sectors of different quality level of the image will be smeared on a wide surface and will not be perceived with the user's eye or easily removed.

For using eye foveal faculties of a group of users, U.S. Pat. No. 4,859,050 1989 described the "Method and system for formation of a visual presentation and looking viewers". According to this method a video film is shot in advance and is recorded on high-quality equipment for its further presentation on the TV-screen. There is a man in front of the screen, who watches the performance. A sensor controls the man eyes which determine the coordinates of the eye optical axis crossing with the screen. A computer converts the sensor data, calculates the objects presented on the screen at the given instance, which the viewer watches, and presents the image of these objects of the screen looking at by the viewer on the graphics. Further using the second graphics video cameras and optical device add signals of the original performance and graphics. The output signal from the video camera is recorded to a second tape of the second video recorder of standard quality. Insignificant elements of the image in the expert opinion are removed from the second tape. The above method allows using averaged grouped foveal eye faculties. However, it insufficiently reflects individual faculties of an individual user. The proposed method has a feature, which makes it unfitted for interactive television, i.e. the absence of dynamism.

Russian Federation patent No. 2134053 "Method of video information presentation and facility for its performance" describes formation of signals coding boundaries of the image sectors and quality level within each sector based on the coordinate data and user's eye orientation, the signals are supplied to the information display facility in information formation facility with conversion of the initial video signal and management of video image such, that the ecological restrictions on the creation of video image are being reduced. This invention takes into account eye foveal faculties and forms video image in the information display facility. This invention allows using eye foveal faculties of an individual user and a group of users gathered in front of one screen of the information display facility.

The above methods and devices do not allow generating, transforming or displaying video information taking into account individual peculiarities of the user's eye and individual peculiarities of a group of users' eyes.

SUMMARY OF THE INVENTION

Unlike known to the authors' technical concepts, which solve separate tasks at stages of formation, transmission, conversion of the video signal and display of video information taking into account individual peculiarities of the user's eyes or individual peculiarities of a group of users' eyes, the proposed method provides simultaneously all or, at least, two operations from the above operations of formation, conversion and transmission of video signal and display of video information perceptible on the screen of information display facilities for one and/or a group of users or an unrestricted group of users.

The method of interactive foveal television for individual and grouped use is intended to obtain the following technical result for a user and a group of users:

1) reduction of consumed computing power of video components facilities;
2) reduction of the required traffic of the data channel for the video signal transmission;
3) reduction of total computing power of video signal converting facilities and number of operations of video signal conversion;
4) reduction of the quantity of data channels for the interrogation signal transmission;
5) reduction of the required traffic of data transfer channel for the interrogation signal transmission;
6) reduction of the required quantity of sensors for eye faculties measurement;
7) compatibility of "new" TV standards and "existing" data transfer channels of video information transmission and TV standards;
8) possibility to work at long distance from the source of video information to the display components;
9) increase of ratio of useful video information volume to the total volume of video information;
10) reduction of the excessive volume of video information during its formation, conversion, transmission and display for a user or a group of users;
11) amelioration of subjective estimation of video image quality by the user;
12) reduction of the negative factor impact to the users' health at the video information perception;
13) protection of video information against non-authorized access, distribution and use;
14) reduced requirements for the power (channel maximum traffic) of channels of video information transmission and computing power of conversion components;
15) provision of individual and grouped users with video information with minimal requirements for information display components.

The above technical result is achieved by providing an inventive method (4M) of interactive television using eye foveal properties of an individual user or/and a group of users, a preferred embodiment (illustrated in FIGS. 1, 5, 6) of which method comprises the following steps:

a video signal formation facility (herein also called 'component'), denoted as a formation component, forms a video signal of an entire frame of a video image (A) and/or forms video signals of sectors of the video image with substantially equal quality levels and predetermined boundaries, or
a video image of an entire frame with different quality levels;

the video signals of the entire frame of the video image are converted at least one time in at least one video signal conversion component (C0) into a series of video signals of video image sectors and/or the level of quality of the video image sectors is converted at least one time (C2), and/or the boundaries of the video image sectors (C1-2) are changed;

the video signals are transmitted via data channels, to at least one conversion component and to at least one display component (B1);

the display component forms a video image (D) that is perceived by at least one user (E);

eye characteristics of the user are determined by employing at least one sensor in operative communication with one eye of the user, the characteristics are defined relatively to the video image formed by the display component and perceived by an eye of the user, and by employing data from the sensor to dynamically establish coding characteristics of signals (N/N1);

the signals are transmitted to at least one computing component (O1);

the computing component generates interrogation signals (K), taking into account an eye resolution (L), communicated in the coding characteristics (N); the interrogation signals include a first category signals, containing information on the boundaries of at least one sector of the video image (K1), and/or a second category signals, containing information on the quality levels of at least one sector of the video image (K2), generating a plurality of interrogation signals for at least for one user (K1-1, K2-1) and/or for one group of users (K2-1, K2-2);

the interrogation signals are transmitted, to at least components of the following types: the formation component (O2-1), the conversion component (O2-2) and the display component (O2-3), wherein the interrogation signals are taken into account with a respective concurrent adjustment in forming the video signals (A1-1/A2-1), converting the video signals (C1-1/C2-1), and forming the video image.

In case of a group of users perceiving a video item, reduction of the negative factor effect on the users' health at the video information perception, protection of video information against non-authorized access, distribution and use for the reduction of the excessive volume of video information by way of use of data on individual peculiarities of the users' eyes, as well as for the amelioration of subjective estimation of video image quality by the user and increase of the ratio of the volume of useful video information to the total volume of video information at the formation of interrogation signals, we propose another method (2M), being a modification of the above indicated (4M), wherein the computing component (O1) generates the interrogation signals (K) for a group of users, which group of users may contain a number of smaller sub-groups. The method further comprises: summarizing the interrogation signals (K2-1, K2-2) for the users of the group, and/or the sub-groups of users.

For the same purpose, as given in the method (2M), but for use of the interrogation signals coding boundaries of video image sectors, we propose an independent method (3M), which differs from the method (2M) by the fact that the interrogation signals coding external boundaries of video image sectors (A2) of the similar quality level are summarized for each level of the video image quality coded in a series of interrogation signals (K2-1, K2-2) for a group of users; in this connection, for each interrogation signal, the external boundary of the video image sector of each quality level comprises external boundaries of all video image sectors with an indicated quality level. The method (3M) can be described as a method of interactive television wherein video signals is generated based on real time user perception of video images comprising of the steps of:

forming a predetermined number of video signals of an entire frame of an initial video image with different predetermined quality levels, including a lowest quality level and a number of higher quality levels, in a video signal formation component; said initial video image is characterized by predetermined boundaries, said boundaries include external boundaries (A1):

transmitting the video signal provided for the lowest quality level of the entire video image from the video signal formation component via conventional signal channels of a conventional video broadcasting system directly to a plurality of display components, said plurality of display components including a number of user display components (B):

transmitting said video signals of the higher quality levels from the video signal formation component via data channels, via a plurality of intermediate conversion components, to said user display components; said intermediate conversion components are substantially connected to said user display components (B1);

changing said boundaries of said video signals of the higher quality levels in the intermediate conversion component; said changing results in formation of a number of areas of each said video signal, wherein the boundaries of at least one of said areas are narrowed (C1)

forming the entire frame video image on a user display component, chosen from said plurality of user display components, said user display component is connected to a group-user. intermediate conversion component chosen from said plurality of intermediate conversion components; wherein said forming is based on the video signal of the entire frame video image of said lowest quality level, and on the video signals of said higher quality levels (D1)

perceiving the entire frame video image by at least one user (E);

determining eye characteristics of the user by employing at least one sensor in operative communication with one eye of the user, said eye characteristics are determined relatively to the entire frame video image formed by the display component and perceived at an eye of said user, and by employing data from said sensor to dynamically establish coding characteristics (N/N1);

generating a plurality of display interrogation signals for one of said display components, said generating is provided in one of the first type computing components, said display interrogation signals provide coding said boundaries, taking into account the eye resolution and dynamically establish coding characteristics of the eyes of users of the corresponding display component, said dynamic characteristics are determined in relation to the video image, and taking into account the characteristics of said predetermined quality levels; said display interrogation signals containing information on the external boundaries of at least one area of the video image with predetermined quality level (K2-1);

transmitting said display interrogation signals to a plurality of computing component of a second type, connected to said group-user intermediate conversion component;

transmitting said display interrogations signals immediately to said user display component (O2-1);

generating a plurality of group interrogation signals within a plurality of computing components of the second type, said group interrogation signals are generated based on the display interrogation signals of at least one computing component connected to a corresponding computing component of the second type;

calculating said external boundaries of the area video image within said second type computing components, in this connection, coding said external boundaries of said areas of an equal quality level for said users or said group of users, the external boundaries of each said quality level include the external boundaries of all said areas with the equal quality level for the respective levels of the video image corresponding to said display interrogation signals (K1-2); wherein said changing of said boundaries of said video signals of the higher quality levels is controlled by said group interrogation signals, taken into account with a respective concurrent adjustment in converting said video signals (C1-1); and said forming of the entire frame video image on the user display component, based on said area video signals, is controlled by said display interrogations signals (D1-1).

For the same purpose, as in the method (2M), but for use of the interrogation signals coding quality levels of video image sectors, we propose an independent method (4M), for interactive television wherein video signals is generated based on real time user perception of video images comprising the steps of:

forming a video signal of an entire frame of an initial video image in a video signal formation component, said initial video image has a predetermined quality level and predetermined dimension (A);

said initial video image is divided into a plurality of sector video images with predetermined boundaries, said sector video images having the same predetermined quality level;

converting the video signal of said initial video image in a video signal transmitter conversion component into a series of sector video signals corresponding to said sector video images (C0);

transmitting said sector video signals from said transmitter conversion component via data channels, via a plurality of intermediate conversion components, to a plurality of display components including a user display component, said intermediate conversion components are substantially connected to said display components (B1);

converting said quality levels of said sector video signals, such that a corresponding quality level of at least one said sector video image is successively reduced, said conversion is provided in said intermediate conversion component (C2);

forming an entire frame video image on the user display component, said user display component is connected to a group-user intermediate conversion component chosen from said plurality of intermediate conversion components, said forming is based on said sector video signals, said entire frame video image being perceived by at least one user (E), said sector video images having the same predetermined boundaries and dynamically changeable quality levels (D2);

determining eye characteristics of a user by employing at least one sensor in operative communication with eyes of the user, said characteristics are defined relatively to the entire frame video image formed by the display component and perceived at an eye of said user, and by employing data from said sensor to dynamically establish coding characteristics (N/N1);

generating display interrogation signals within a plurality of computing components of a first type, each of said first type computing components is connected to a predetermined display component chosen from said user display components, taking into account an eye resolution of a corresponding user, and said coding characteristics; said display interrogation signals containing information on the quality levels of at least one sector video images (K2-1);

transmitting said display interrogations signals to one of a plurality of computing component of a second type, connected to said group-user intermediate conversion component (O2-2);

transmitting said display interrogations signals immediately to said user display component (O2-1);

generating a plurality of group interrogation signals within a plurality of computing components of the second type, said group interrogation signals are generated based on the display interrogation signals of at least one computing component connected to a corresponding computing component of the second type;

calculate said quality levels of the sector video image within said second type computing component; in this connection, the quality level of said sector video signals is set as the highest quality level for respective sectors of the video images corresponding to said display interrogation signals (K2-2)

converting the quality levels of said sector video signals, such that a corresponding quality level of at least one said sector video image is reduced, said conversion is provided in said group-user intermediate conversion component (C2-2), wherein said group interrogation signals are taken into account with a respective concurrent adjustment in converting of said video signals (C2-1); and said forming of an entire frame video image on said user display component, based on said sector video signals, is controlled by said display interrogations signals of said correspondent user display component (D2-l).

When quality levels for video signals are standardized that to simplify video signal conversion process in conversion components, to protect video information against non-authorized access, distribution and use, to decrease the requirements for the channel power (for the channel maximum traffic) of video information transmission component and computing power of conversion components, to provide individual and grouped users with video information with minimum requirements for information display components, to provide the compatibility of the "new" TV standards with the "existing" data transmission channels and TV standards, we propose a method (5M) which differs from the method (3M) by the fact, that the forming of video signals is provided for the different quality levels, and such forming further comprises:

changing the boundaries of each said area of the video image in the intermediate conversion component except for the area of the highest quality level, said boundaries including internal and external boundaries, the internal boundaries of all the areas, except the highest quality level area, correspond to the external boundaries of the video image with the next higher quality level (C1-1-1).

In case that a video signal of the initial video image is received from the facility of video signal formation of the same quality level, we propose a method (6M), which differs from the method (5M) by the fact, that the video signal of the entire video image is converted into a series of video signals of the entire video-image with different quality levels (C0-1).

According to the methods (5M) and (6M) video signals of all quality levels, except for the lowest level, with sequential conversion and transmission from the video signal formation component to the information display component, reduce their area, whereas the sector of video image with the lowest quality level throughout the above conversion increases its area, covering in the information display component the area of video image achieving the level of 90-99%. With a view to reduce the required traffic of the information channel for the transmission of video signals, to increase the ratio of the volume of useful video information to the total volume of video information, we propose an independent method (7M) of interactive television wherein a video signal is generated based on real time user perception of video images comprising the steps of:

a video signal formation facility (herein also called 'component'), denoted as a formation component, forms a video signal of an entire frame of a video image (A) and/or forms a video image or video signals of sectors of the video image with substantially equal quality levels (A1), or a video image of an entire frame with different quality levels (A2)

the video signals of an entire frame of a video image-are converted at least one time in at least one video signal conversion component (C0) into a series of video signals of video image sectors and/or converted at least one time the level of quality of the video image sectors (C2), and/or boundaries of the video image sectors (C1) are changed;

the video signals are transmitted via data channels, to at least one conversion component and to at least one display component (B1);

the display component forms a video image (D) that is perceived by at least one user (E);

determining eye characteristics by employing at least one sensor in operative communication with one eye of the user, said characteristics are defined relatively to the video image formed by the display component and perceived at an eye of said user, and by employing data from said sensor to dynamically establish signal coding characteristics (N/N1), transmitting said signals having said coding characteristics to at least one computing component (O1);

generating interrogation signals with said computing component, taking into account the eye resolution, communicated in the coding characteristics, said interrogation signals include a first category containing information on the boundaries of at least one sector of the video image and/or a second category containing information on the quality levels of at least one sector of the video image (K1-1);

transmitting said interrogation signals to at least components of the following types: said formation component (O2-1), said conversion component (O2-2), and said display component (O2-3); wherein the interrogation signals are taken into account with a respective concurrent adjustment in forming of said video signals, converting said video signals, and forming said image;

said forming video signals is provided for said different quality levels, and further comprises:

transmitting said video signals via data channels, at least, to one said conversion component (B), subjected to said first category interrogation signals, changing the boundaries of each sector of the video image in the conversion component except for the sector of the highest quality level, said boundaries including internal and external boundaries, the internal boundaries of all the sectors, except the highest quality level sector, correspond to the external boundaries of the video signal with the next higher quality level (C1)

the first quality level corresponds to a basic level;

said transmitting the video signal is provided for the basic level of the entire video image via data channels of a conventional video broadcasting system to every said display component directly, or via the conversion component, associated with the display component; and subjected to said interrogation signals containing at least information on the boundaries of a sector with the lowest quality level, changing the internal boundaries of each sector of the video image in the conversion component (C3).

In the case that levels of video signal quality of low and high quality levels are characterized by the fact that an element of video image (e.g., pixel) of the video signal of low quality covers the whole quality of video signal elements of high quality level, with a view to reduce the required computing power of video signal formation component, to reduce the aggregate computing power of video signal conversion components and the quantity of operations, we propose a method (8M), which differs from the method (3M) by the fact that the video signal of the entire video image or the sectors of the video image of a predetermined low quality level formation components (A1-2 or A2-2), further comprises: calculating a value of a pixel of the video image of said low quality level as the mean value of values of pixels of a predetermined high quality level of the video image, wherein pixels has predetermined boundaries, said pixels of a predetermined high quality level of the video image are restricted with the boundaries of said pixel of the predetermined low quality level (I1).

For decreasing the requirements for the channel power (maximum traffic) of video information transmission component and for the computing power of video signal conversion components, for simplicity of computing in the video signals conversion component, we propose a method (9M), which differs from the method (3M) by the fact, that the forming the video signal of the entire video image or of the sectors of the video image of a predetermined low quality level in the formation component (A1-2 or A2-2) further comprises:

calculating a value of a pixel of the video image of said low quality level as the value of pixel of a predetermined high quality level of the video image, wherein said pixel of the video image of said low quality level has predetermined boundaries, said pixel of the predetermined high quality level of the video image is inboard of said pixel of the predetermined low quality level(I2).

In case that quality levels for video signals are standardized by a series of quality levels, comprising the lowest quality level and a series of higher quality levels with respect to it, that to reduce the volume of the transmitted information and to reduce the requirements for the computing power of the conversion components, as well as to protect video image against non-authorized access, distribution and use, we propose an independent method (10M) of interactive television wherein video signals are generated based on real time user perception of video images comprising the steps of:

forming a predetermined number of video signals of an entire frame of an initial video image with different predetermined quality levels in a video signal formation component said initial video image is characterized by predetermined boundaries (A6); said different predetermined quality levels include a number of quality levels, starting from a lowest first quality level, the number of quality levels includes a second quality level corresponding to a first extended quality level, a third quality level corresponding to a second extended quality level, and so on said forming a video signal of the first extended quality level in the video signal formation component further comprises:

subtraction of the first quality level video signal from the second quality level video signal; whereas said forming the video signal of the second and higher numbers extended quality levels are obtained by subtraction from the respective quality level video signal of a video signal with the next quality level (R);

transmitting the video signal provided for the lowest quality level via conventional signal channels of a conventional video broadcasting system directly to a plurality of display-conversional components, each said display-conversional component is connected to a corresponding said user display component (B);

transmitting said video signals of the extended quality levels from the video signal formation component via data channels, via a plurality of intermediate conversion components, to said display-conversional components, said intermediate conversion components are substantially connected to said display-conversional components (B2);

changing said boundaries of said video signals of the extended quality levels in the intermediate conversion component, said changing results in formation of a number of areas of each said video signal wherein the boundaries of at least one of said areas are narrowed (C1);

summarizing the video signals of the lowest quality level and of all of the extended quality levels, thereby obtaining a summary video signal of the entire video image in the display-conversional component connected to the corresponding user display component (S);

transmitting said summary video signal to a user display component, chosen from said plurality of user display components (B3)

forming the entire frame video image on the user display component, said user display component is connected to a display conversion component chosen from said plurality of intermediate conversion components (D);

perceiving the entire frame video image by at least one user (E)

determining eye characteristics of the user by employing at least one sensor in operative communication with one eye of the user, said eye characteristics are determined relatively to the entire frame video image formed by the display component and perceived at an eye of said user, and by employing data from said sensor to dynamically establish coding characteristics (N/N1), generating a plurality of display interrogation signals for one of said display components, said generating is provided in one of the first type computing components, said display interrogation signals provide coding said boundaries, taking into account the eye resolution and dynamically establish coding characteristics of the eyes of users of the corresponding display component, said dynamic characteristics are determined in relation to the video image, and taking into account the characteristics of said predetermined quality levels; said display interrogation signals containing information on the external boundaries of at least one area of the video image with predetermined quality level (K1-1)

transmitting said display interrogation signals to one of a plurality of computing component of a second type, connected to said group-user intermediate conversion component;

transmitting said display interrogations signals immediately to said user display-conversion component (O2-2);

generating a plurality of group interrogation signals within the second type computing components said group interrogation signals are generated based on the display interrogation signals of at least one computing component connected to a corresponding computing component of the second type;

calculating said external boundaries of the area video image within said second type computing components, in this connection, coding said external boundaries of said areas of an equal quality level for said users or said group of users, the external boundaries of each said quality level include the external boundaries of all said areas with the corresponding quality level (K1-2);

wherein said changing of said boundaries is controlled by said group interrogation signals taken into account with a respective concurrent adjustment in converting said video signals (C1-2)

said forming of the entire frame video image on the user display component, based on said area video signals is controlled b said display interrogations signals; and/or subjected to said group interrogation signals containing at least information on the boundaries of said areas of the video image of any of said extended quality levels, at least one time changing the boundaries of the areas in at least one intermediate conversion component (D);

in this connection, the video signals of the second and higher numbers quality levels are converted in a display-conversional component connected with the user display component for every video signal (S-2).

For reducing the required traffic of the data channel for transmission of video signals, compatibility of "new" TV standards and "existing" data transmission channels of video information and TV standards, we propose a method (11M), which differs by from the method (10M) by the fact, that the users consist of two types of users: registered users and non-registered users; the transmitting of the video signal of the lowest quality level is provided to the corresponding user display components of the registered users and non-registered users (B1-2).

Should the element of video information of low quality video signal of the video information occur to be determined as the average value from video information elements of high level quality video signals covered by the above element of video information with low quality level (A4. C8), for the purpose of reduction of the volume of video information transmitted through communication channels, we propose a method (12M), which differs by the fact, that the pixel of the video signal of the extended quality level of video image in the component of video signal formation or in the component of video signal conversion is determined by subtraction of high quality level pixel of video image (I3); the video signal pixel with basic quality level in the component of video signal conversion or the component of information display video signal pixel of high quality level of the video image is formed by way of summing the video signal pixel of the extended quality level and the video signal pixel of the quality basic level (J3).

Should the element of video information (pixel) of low quality video signal occur to be determined as one of pixels of video signals of high quality level forming a part of the video image sector restricted with boundaries of the above video signal pixel of low quality level of video image (A1-2 or A2-2), for the purpose of reduction of the volume of video information transmitted through communication channels and reduction of volume of computations in video signal conversion component, we propose any method (13M), which differs by the fact, that the video signal pixel of basic quality level in the components of video signal formation or video signal conversion is determined as equal to the video signal pixel of high quality level forming a part of video signal pixels of high quality level of video image sector, included into video image sector, restricted with boundaries of the above video signal pixel of the basic quality level (A8, C11-1); the other pixels are determined by way of subtraction of video signal pixels with basic quality level from the pixels of high quality level (I2), video signal pixel of high quality level is determined in the components of video signal conversion or information display as corresponding to video signal pixel of the basic level (I4); the other video signal pixels of high quality level included in the video image sector restricted with the boundaries of the pixel of the relevant video signal of the basic quality level are formed by way of summing the relevant video signal pixels of the extended quality level and the relevant video signal pixel of the basic quality level (J4).

With a view to provide the compatibility of the "new" TV standards and the "existing" video data transmission channels and TV standards, to reduce the effect of the negative factors to the users' health at the simultaneous perception of video information by means of one or different information display components, to sum video signals of basic and extended levels in one video image formed in the information display component, we propose a method (14M), which differs from the method (3M) wherein said user display component is represented by a conventional CRT including: a screen, a gun-cathode, an electronic beam deflector, a size screen dot unit for dynamic control of the dot on the screen; said method further comprises:

successive transferring video signals of said areas with different quality levels to the gun-cathode (B1);

synchronous transferring said display interrogation signals for said areas each, wherein said display interrogation signals carry encoding information on the boundaries of said each area, said transferring the display interrogation signals is provided to said electronic beam deflector, said synchronous transferring of said display interrogation signals is provided synchronously with the entire frame video image (O-1); and synchronous transferring said display interrogation signals for said areas each, wherein said display interrogation signals carry encoding information on the quality levels of said areas, and said transferring the display interrogation signals is provided to said size screen dot unit, said synchronous transferring of said display interrogation signals is provided synchronously with the entire frame video image (O-2).

With a view to provide the operation for long distances from the source of video information to the video display component and provision of individual and grouped users with video information at the minimum requirements for the information display components, we propose a method (21M), wherein said method further comprises:

a preliminary step of recording video signals of a predetermined lowest quality level, transmitting said video signals of a predetermined extended quality level to the user display components (B), and reading up said recorded video signals of the lowest quality level during the step of transmitting said video signals, thereby reducing the information volume to be transmitted.

BRIEF DESCRIPTION OF THE DRAWINGS OF THE INVENTION

FIG. 1 illustrates a block diagram of an embodiment of the inventive method of foveal interactive television for one individual user included in a group consisting of two users.

FIG. 2a. illustrates a video image with one (lowest) quality level.

FIG. 2b. illustrates a video image consisting of sectors with different quality levels.

FIG. 2c. Video image consisting of sectors with different quality levels and boundaries, which differ with respect to the video image sector boundaries.

FIG. 2d. illustrates a video image consisting of sectors with different quality levels, with boundaries comprising video image quality levels Nos 3b and 3c.

Figures 3, 3A, 3C:
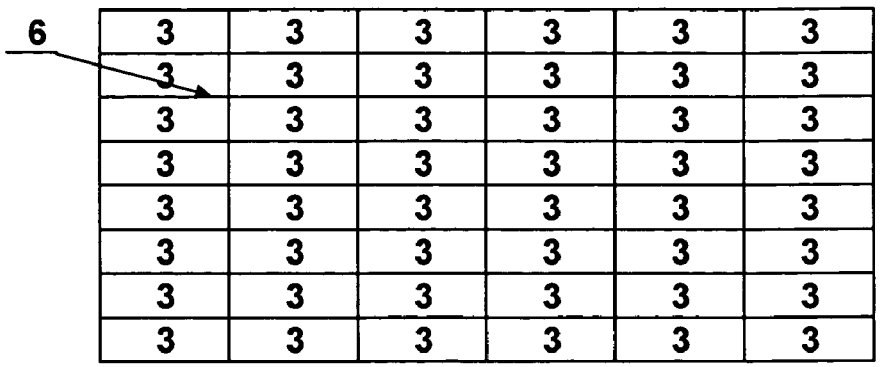

FIG. 3a. illustrates a video image consisting of sectors with assigned boundaries and one maximum quality level.

FIG. 3b. illustrates a video image consisting of sectors with assigned boundaries and with different quality levels.

FIG. 3c. illustrates a video image consisting of sectors with assigned boundaries and with different quality levels, which differ from quality levels of video image sectors.

FIG. 3d. illustrates a video image consisting of sectors with the same boundaries that are shown in FIG. 3a, 3b, 3c and with quality levels in each sector not worse than the quality level of sector 4b or 4d.

Figure 4:
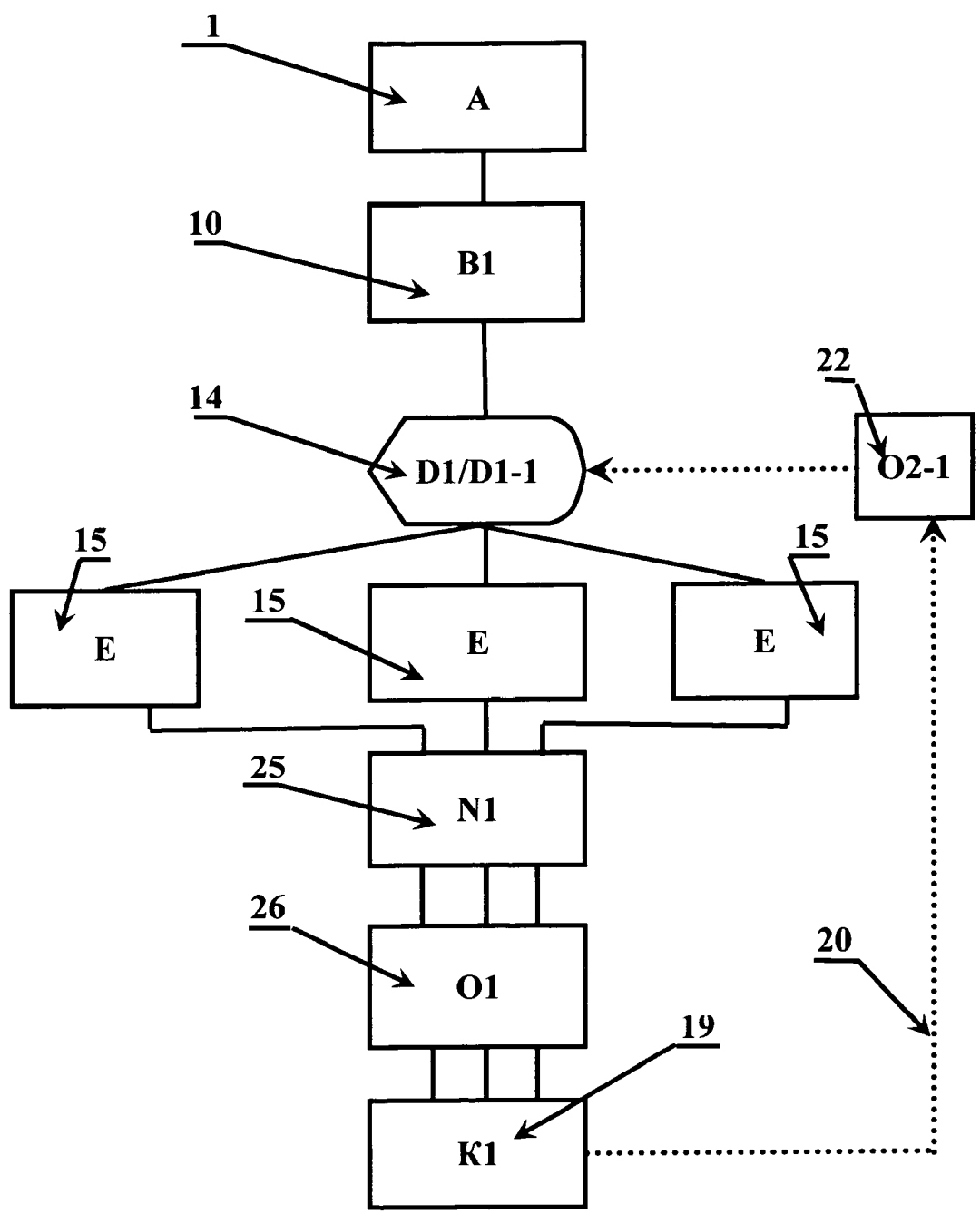

FIG. 4. illustrates a block diagram of the method of interactive foveal television. The users are located in front of several display components.

Figure 5:
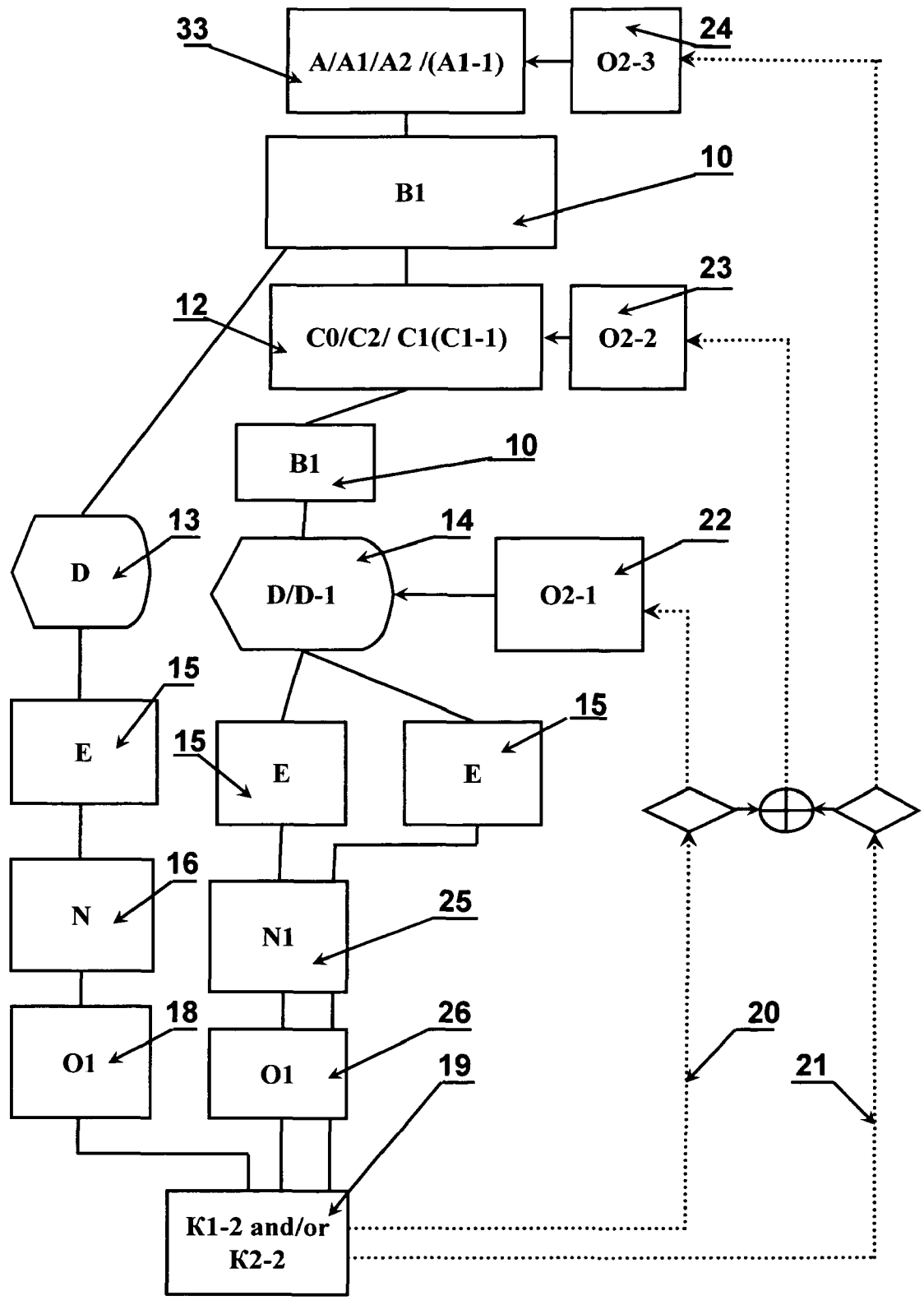

FIG. 5. illustrates a block diagram of the method of interactive foveal television for several users located in front of one display components.

Figure 6:
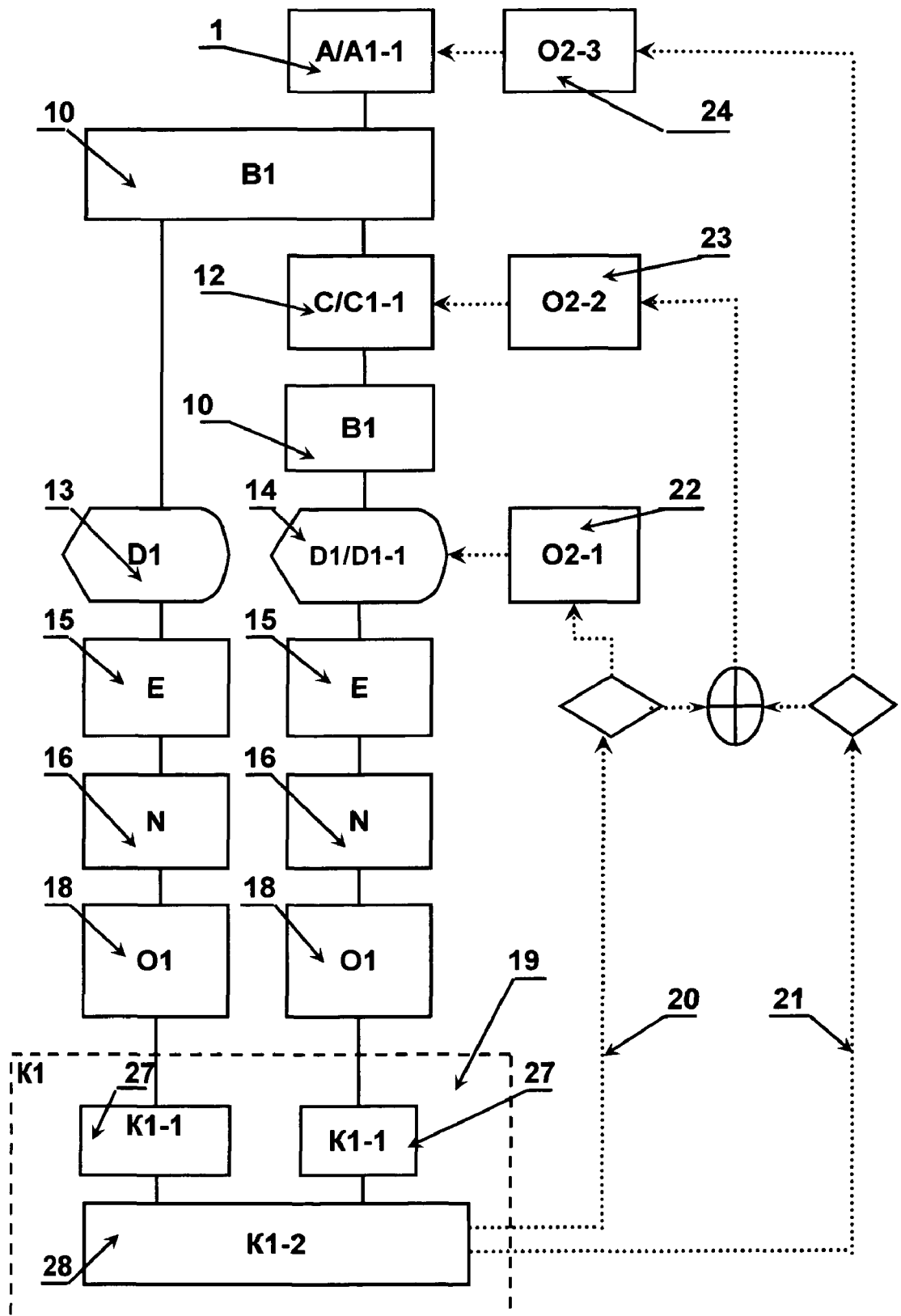

FIG. 6. illustrates a block diagram of the method of interactive foveal television, according to an embodiment with stage formation of an interrogation signal with formation and conversion of boundaries of video image areas with different quality levels.

Figure 7:
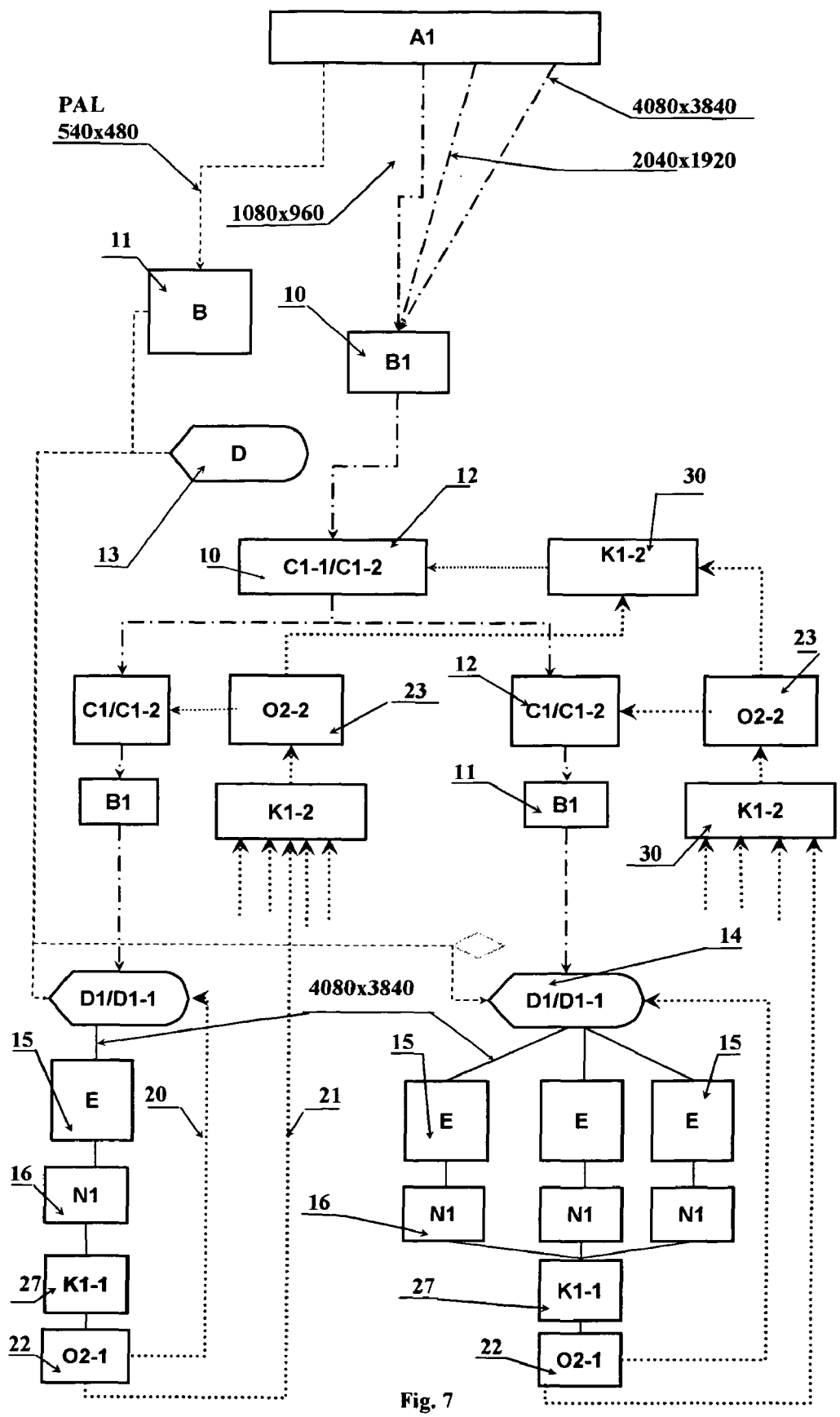

FIG. 7. illustrates a block diagram of the method of interactive foveal television, according to an embodiment with stage conversion of the quality levels of video image areas.

Figure 8:
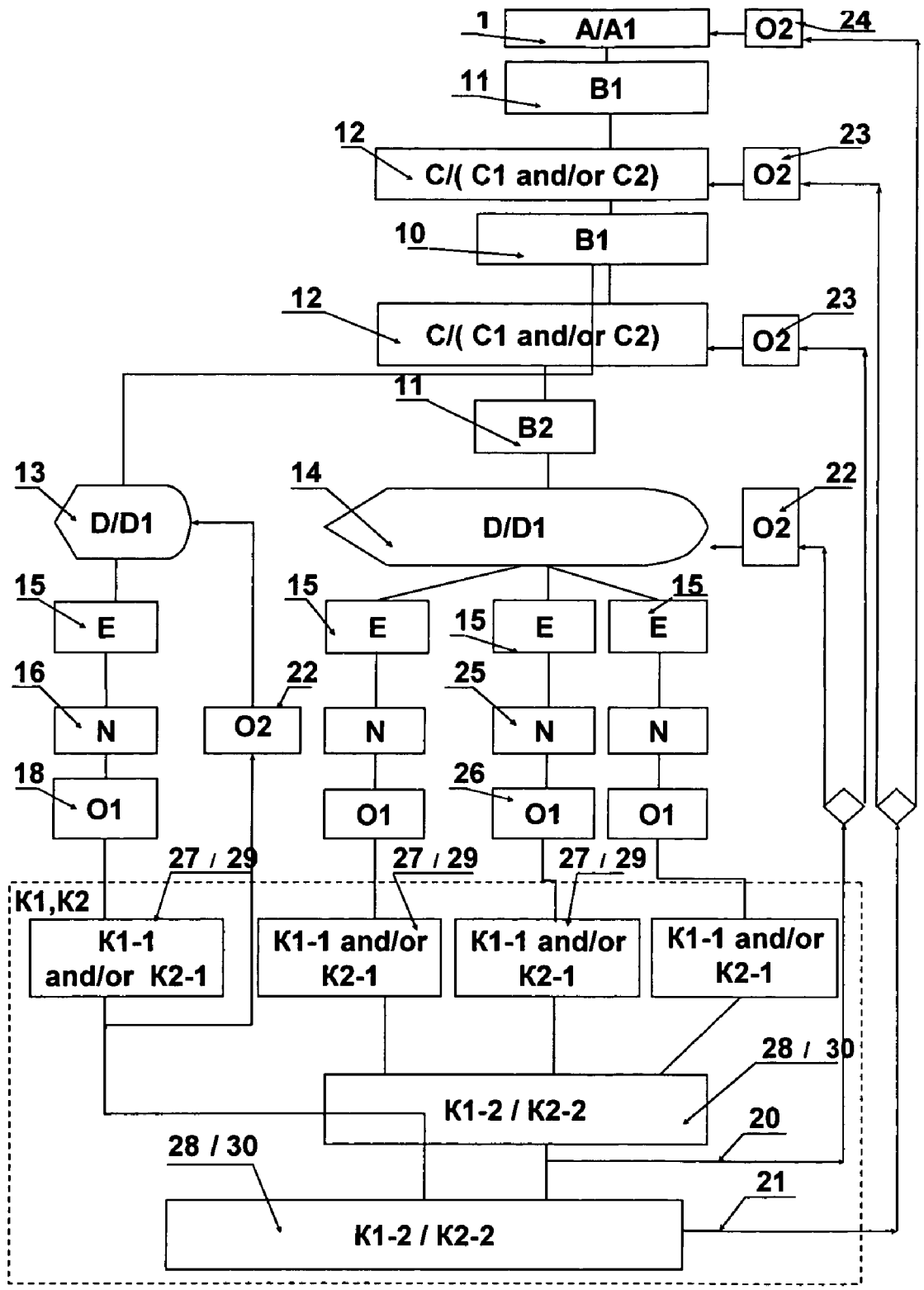

FIG. 8. illustrates a block diagram of the method of interactive foveal television according to an embodiment, wherein individual interrogation signals are transmitted to the display components and the video signal conversion component connected therewith, whereas the grouped interrogation signal is transmitted to the formation and conversion components and to a group of display components.

Figure 9:
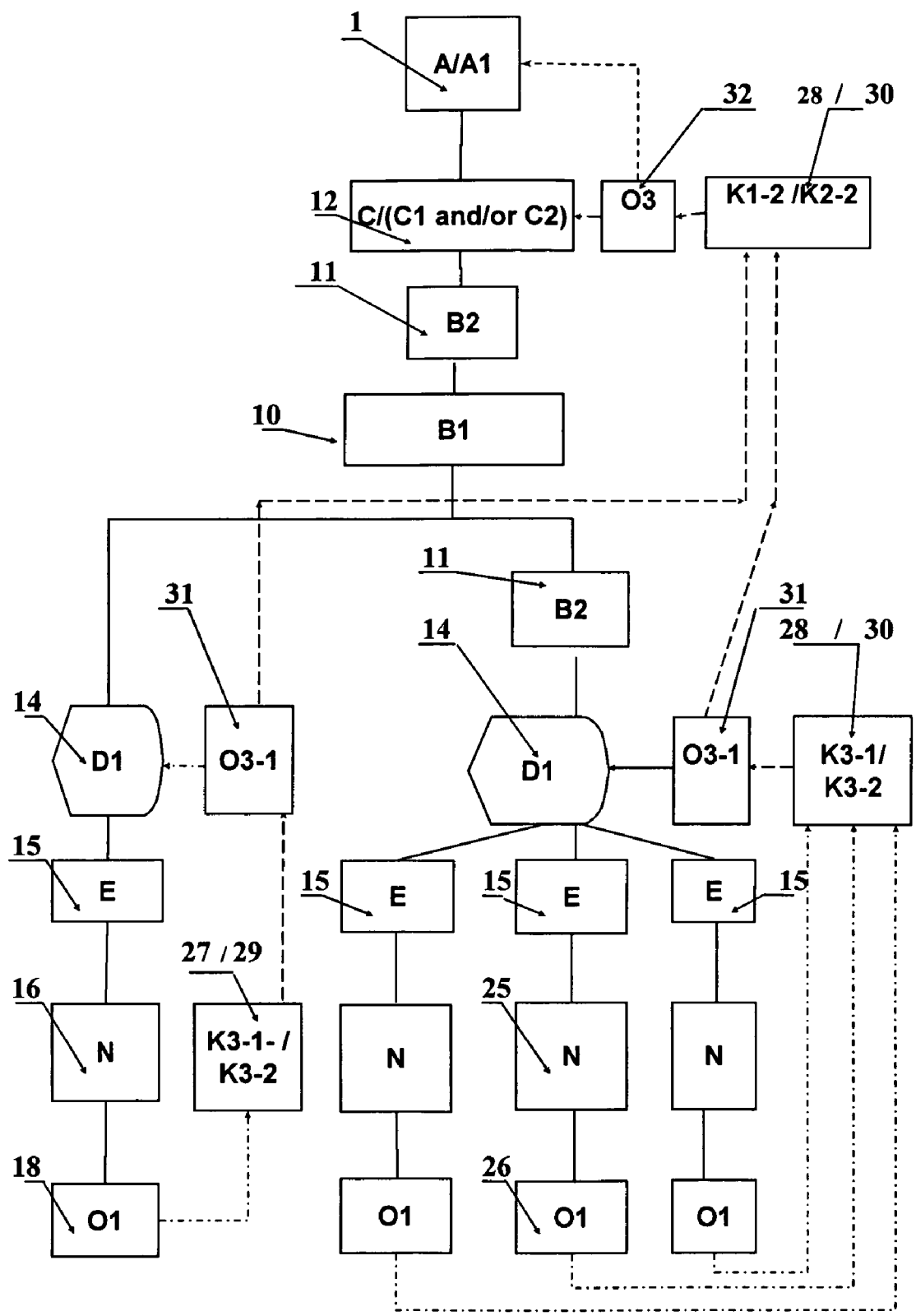

FIG. 9. illustrates a block diagram of the method of interactive foveal television according to an embodiment with stage formation of interrogation signals in individual computing components.

Figure 10:
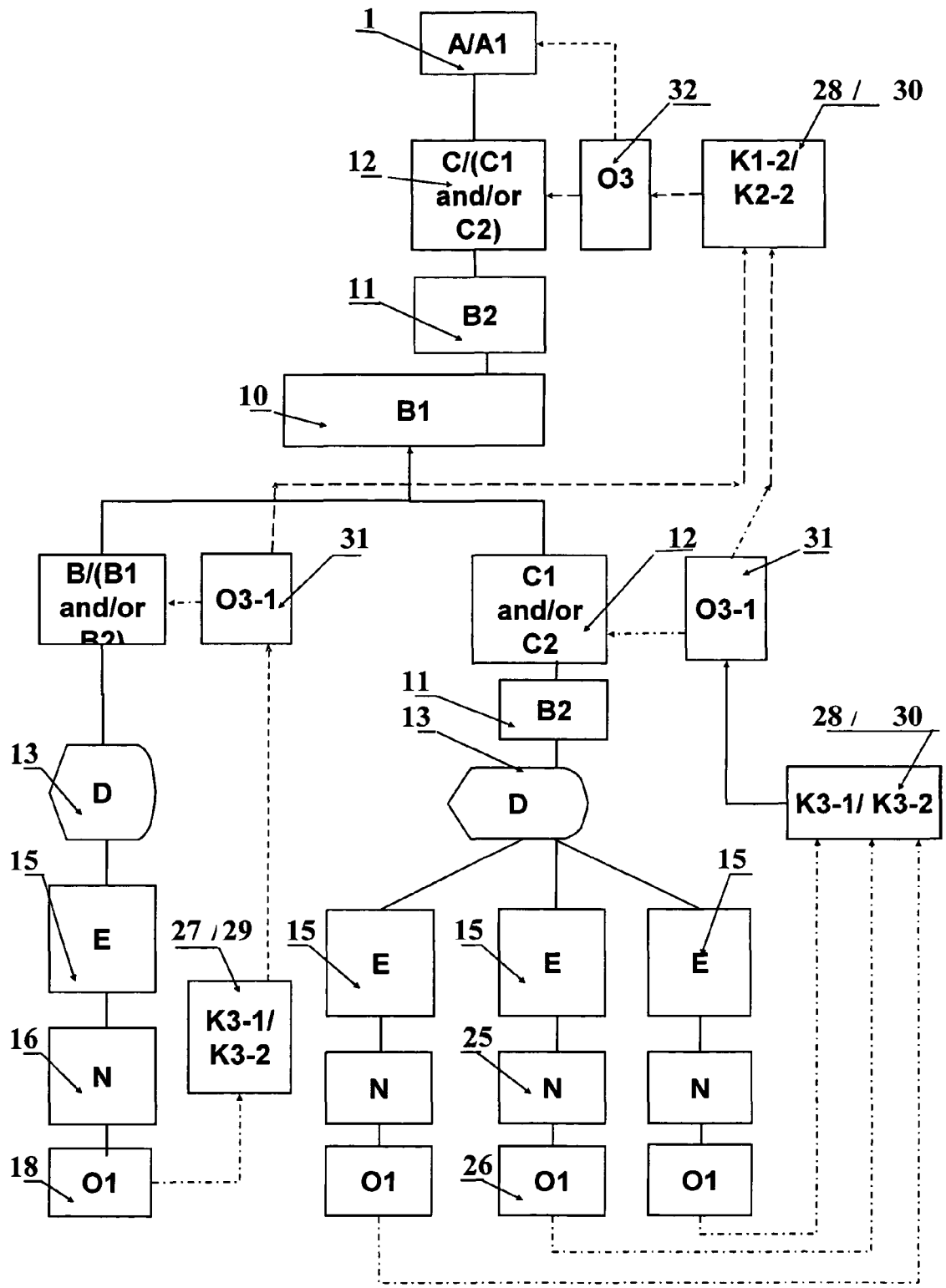

FIG. 10. illustrates a block diagram of the method of interactive foveal television according to an embodiment with stage formation of interrogation signals in individual computing components connected with of video signal conversion components.

FIG. 11. illustrates a boundaries of video image areas with quality levels converted several times.

Figure 12:
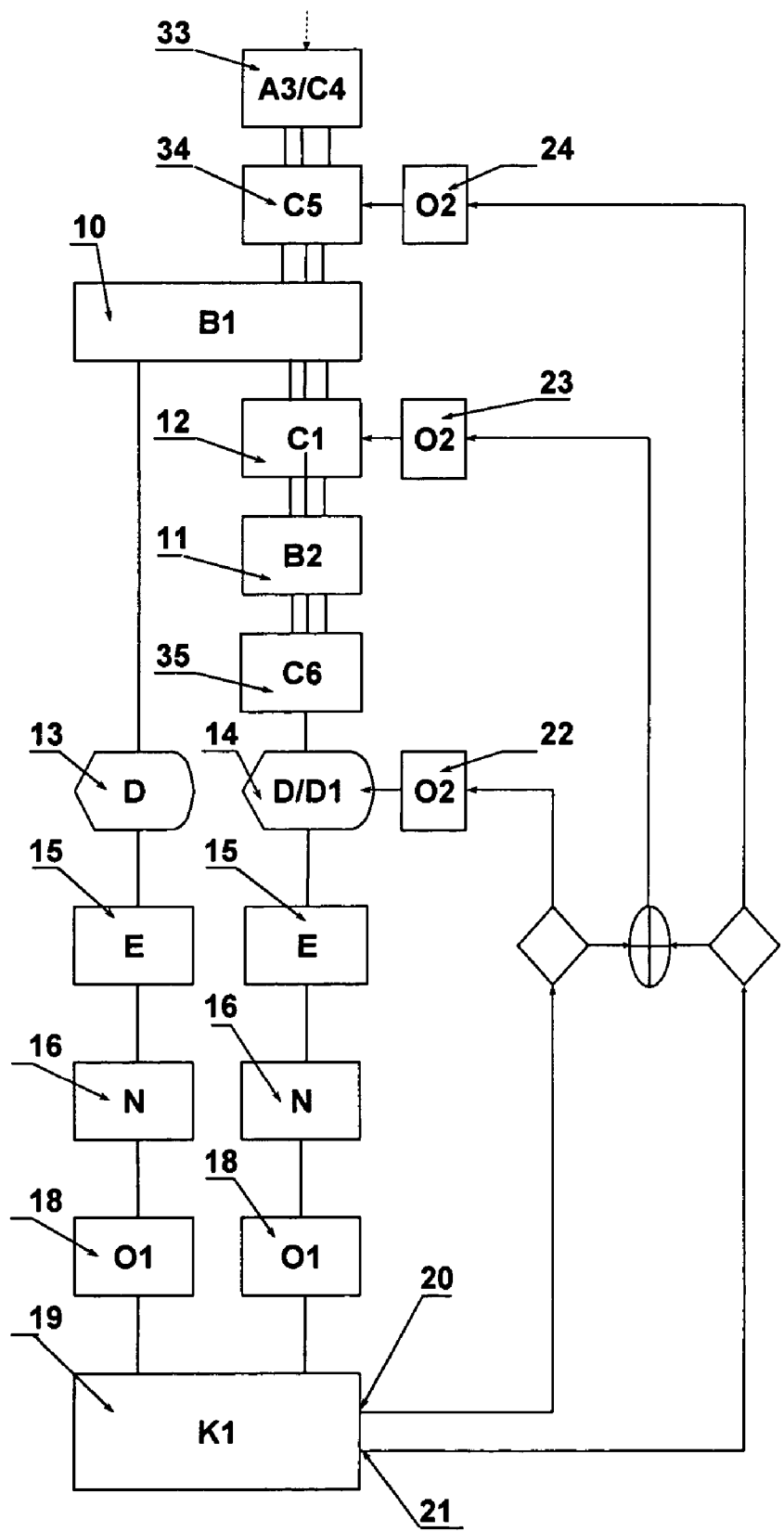

FIG. 12. illustrates a block diagram of the method of interactive television for an embodiment with a single preliminary conversion of the quality level and sequential conversion of sector boundaries of the video image.

Figure 13:
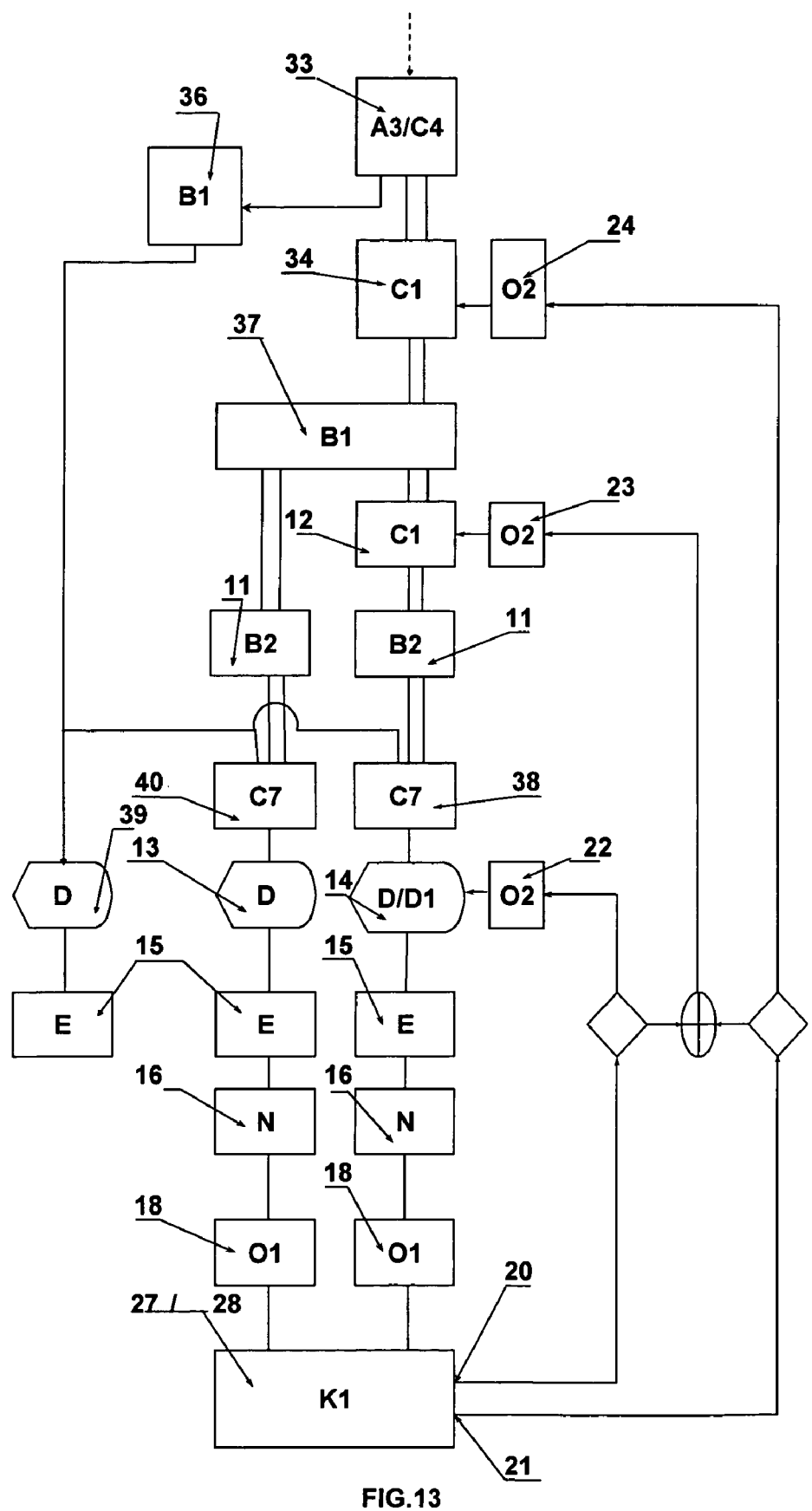

FIG. 13. illustrates a block diagram of the method of interactive foveal television, according to an embodiment with conversion of video signals into signals of high and low quality levels and with a low quality level video signal transmission to the standard video display components.

Figure 14:
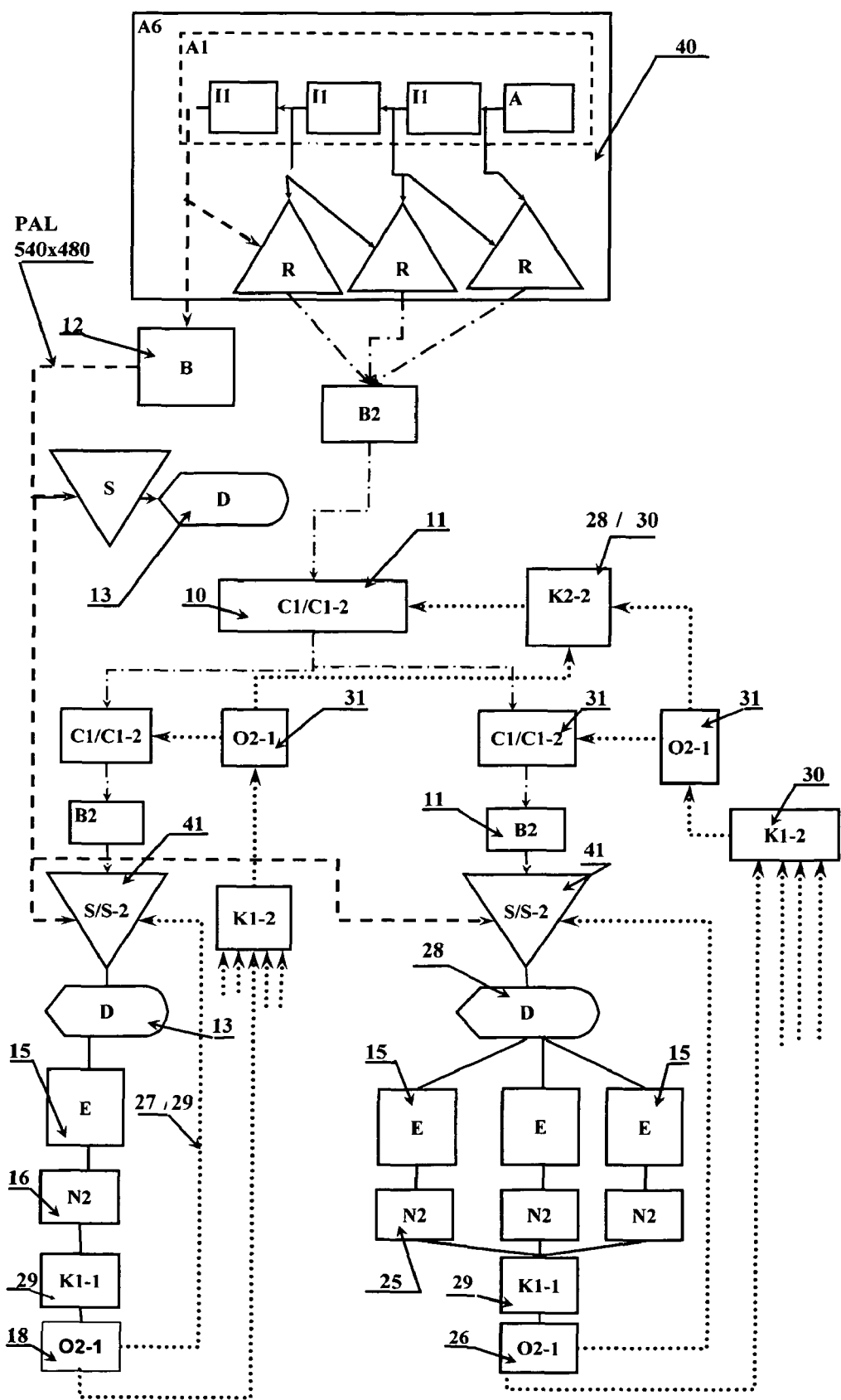

FIG. 14. illustrates a block diagram of the method of interactive foveal television according to an embodiment with conversion of the video signals into video signals of basic and extended quality levels.

DETAILED DESCRIPTION

1. The method of 4M interactive television using eye foveal faculties of individual and grouped users, which protects video information against non-authorized access and distribution, is presented in detail on the block-diagrams of in FIGS. 1, 5. It presents a variant of interactive television for a minimal group of users, consisting of the users of two information display facilities and for, at least, one individual user perceiving a video item in one information display facility. It comprises the following operations:

Ref. 1—A video signal of an entire frame of a video image is formed in the video signal formation component (A). The entire frame of a video image corresponding to the formed video signals may consist of one sector with a permanent quality level such as in case of traditional television (A1), e.g., that one, which is conditionally shown in FIG. 2, Ref. 2, or two and more sectors with different quality levels intended for broadcasting to multi-screen information display facilities (A2), Refs 3, 4, 5.

Video signals may be formed with a constant-in-time quality level of the video image or have a time-dependent predetermined quality level of the video image.

The quality level of video image and an area of the entire frame of the of video image may be presented by the following characteristics or parameters:
 spatial resolution of the coded video image (quantity of video image pixels);
 pixel colored resolution, i.e. the number of colors, which may be formed by one pixel of the coded video image;
 number of "gray" tones;
 temporary resolution characterized by the frequency of frame shift within a sector or the time of sector presentation of the video image;
 video image contrast;
 used methods of scalability, such as:
 signal/noise ratio;
 etc.

The video signals are formed with time-constant predetermined boundaries or with time-dependent changing boundaries. In this connection, video signals with the same quality level are formed in different areas (see also FIG. 3*a*, Ref. 6) (A1) or with different quality levels (A2) (see also FIG. 2*b* or 3*b*). Three quality levels conditionally present sectors shown in FIGS. 2 and 3: the lowest (Ref. 7), the medium (Ref. 8) and the highest quality level of video signals (Ref. 9).

The video signals are formed separately in the video components (A, A1, A2), i.e. without any control signals (A), or by interrogation signals (FIG. 1, Ref. 1), coding quality levels of video image areas, and/or video signals are formed with variable quality levels within the stated areas of the video image (A21), and/or video signals with variable boundaries within the stated sectors (A11) are formed by interrogation signals coding boundaries of the video image areas. The areas may cover a part of the image, or the entire frame of the video image, complementing each other or overlapping each other.

A video camera may be used as the video signal formation component, i.e., a video camera, which is capable to form intercomplementary video signals of different quality levels, e.g., shown in FIGS. 2*a*, 2*e*, 2*f*, 2*h* (Refs 2, 3, 4, 5) for video camera, which may change the orientation and/or field of vision when changing the focal depth and/or diaphragm aperture of the video camera objective taking into account the interrogation signals coding boundaries of the areas and/or quality level of the video signal in the assigned sectors. It is also possible to use a combination of two or more video cameras with different quality level, as in the case of U.S. Pat. No. 4,028,725.

Should the used source of video information occur to be a display component of the video signal, the such display component has the capacity to read off a part of the recorded information by the interrogation signals and to display only those that were preliminarily distributed, while the recording areas of the utilized data medium, which correspond to different areas of the full picture frame and/or different quality levels of the video signal within the boundaries of the above areas of the video image taking into account interrogation signals. The video signals may be formed in computer video components forming double sighting information or a virtual reality similar to computer games.

Formation of video signals consisting of areas with different quality level by the programmable method is described in Russian patent No. 021498908 and in U.S. Pat. No. 4,028, 725.

The purpose of such division of the video image into areas and reduction of the quality level in individual or all areas of the video image consists in the reduction of the video signal data volume transmitted through data channels and in the reduction of the video image data redundancy formed by means of the screen of information display component.

Ref. 10—Video signals are transmitted through data channels from the source of video information, which is represented by video components or video signal conversion components, to two or more video signal consumers represented by a signal conversion components and, at least, to one display component (B1).

Ref. 10—Video signals are transmitted through data channels from at least one source of video signals to one consumer of video signals (B1-1).

The video signals are fully transmitted to all of the aforementioned components or the video information is transmitted in a reduced volume according to the interrogation signals coding area boundaries of video signals and/or the quality level within the areas of the video image.

The video signal transmission (Refs 10) via a cellular network presumes, that the user is a network subscriber, so he (she) receives individual video signals or the video signals of video image sectors via an established communication channel. When the video signals are transmitted from one user or a group of users through a transmitter, similar to the transmitter provided in the cellular network, all users possessing aerial (wireless) receivers of a respective range located in the transmitter coverage zone, constitute one group of users. The transmitter transmits all video information ordered by a group of users on the air; video information channels are formed according to individual interrogation signals linked with a particular user, e.g., by way of transmission of video signal coordinates of the video image sector or decoding keys ordered by the user of the video image sector to the receiver. In case where the user does not form interrogation signals, he (she) may receive the entire grouped video signal for the further conversion and/or display of the video signal ordered by a group of users.

Ref. 12—Video signals with constant predetermined sector boundaries and/or with a constant quality level within these sectors or by interrogation signals coding the video signal sector boundaries and/or quality levels of video signals of video image sectors are converted in the video signal conversion component taking into account the interrogation signals; the incoming video signal is accordingly converted into video signals with variable boundaries and/or with variable quality levels within the stated sectors (C2).

The area of the video image sector is reduced in the video signal conversion component at least with respect to one video signal coming to the video display components (C1), and/or the quality level is reduced with respect to at least one video signal by way of simultaneous reduction of one or several parameters of the quality level.

The video signal conversion taking into account interrogation signals is done in one or several stages depending on the number of users provided with the sensors used for the determination of eye characteristics and depending on the extent to which the structure of the users is ramified.

The video signal conversion may be conventionally divided into stages.

The first stage of conversion consists in the conversion by the sum interrogation signal at the level of a town and/or at the level of a region and/or at the level of a residential quarter (other divisions are possible and this is not important), i.e., on the top level of the users' hierarchical scheme.

The further stages of video signal conversion consist in conversion by the sum interrogation signal (received by summing of interrogation signals of individual users and a group of users) at the level of streets, a building and/or a building entrance, which represents the following level of the users' hierarchical scheme of the interactive television.

The last conversion stage is used for the video signal conversion taking into account individual interrogation signals coming directly from individual users depending on the availability of the data from the users' sensors.

Video signals may be converted in two or more conversion components in parallel, e.g., for the users perceiving a video item on different information display components (see FIGS. 2b and 2c) and/or in series, a video image with one quality level, shown on FIG. 2a is converted into a video image, FIG. 2d for several users, next the video image is converted into the video image with boundaries and quality levels of video image sectors for a single user (FIG. 2b or 2c).

When video signals are converted in video signal conversion components, the volume of video image signal information is reduced dynamically. The dynamic reduction of video information volume in the video signal conversion components, taking into account signals coding user's eyes orientation is described in U.S. Pat. No. 4,405,943. However the above method fits only for individual users.

Ref. 13—Screens of information display components are used for video image formation, which corresponds to incoming video signals. Areas of the video image corresponding to the incoming video signals have boundaries and a quality level of video image corresponding to the characteristics of the incoming video signal (D). The above operation is done using video display components without taking into account interrogation signals. In this connection, characteristics of user's eye may not be measured with sensors.

Ref. 14—When the interrogation signal coding boundaries of video image sectors, comes to the information display facility, and/or when the quality level in the above sectors differs from the boundaries of video signals arrived to the display components, video image is generated in the above facility with boundaries and quality levels corresponding to the interrogation signal (D2-1). The above task may be solved using the datainformation display facility previously proposed by the authors on the basis of CRT, liquid crystal screens, etc., e.g., as described in Russian patent No. 2134053.

Ref. 15—One or several users perceive the video image formed on the screen of at least one information display component (E). There may be one, two or more users viewing one video image as it is shown in FIG. 4.

The quality level of video image or its sector perceived by the user's eye may be represented by the following characteristics or parameters:
 spatial resolution of a full picture frame (minimal angle dimension of pixels perceived as separate pixels or maximum number of pixels in a single spherical angle perceived by an eye, as separates pixels);
 colored resolution as per the number of colors, which may be distinguished by an eye in a single spherical angle;
 number of "gray" color tones;
 time dependent resolution characterized by the frequency of frame shift within an area perceived by an eye, such as blinking;
 brightness;
 contrast of the video image;
 etc.

Ref. 16—A known sensor or sensors are used for the dynamic determination of the eye characteristics with respect to the video image perceived by the user with formation of data interrogation signals coding eye characteristics (N) or eye characteristics of several users as it is shown in FIG. 4, Ref. 25.

The following eye characteristics may be dynamically measured by means of the sensor or sensors: eye orientation, eye coordinates with respect to the video image and other characteristics. In this connection, coordinates of one or two eyes of the user, or several eyes or all eyes of users gathered in front of the screen are determined. There is a variant, when every user located in front of the screen is furnished with a sensor. Every eye may be fitted with an individual sensor, e.g., of the helmet type.

Ref. 18—Data interrogation signals coding eye or eyes characteristics (Ref. 26) are transmitted at least to one computing component (O1), in this connection, dynamically changed characteristics such as coordinates and direction of the eye optical axes, and the eye accommodation depth are dynamically transmitted (O1-1), whereas slowly changed characteristics, such as the eye apple diameter, and the function of eye resolution dependence with respect to the eye optical axis are transmitted to the computing component by a periodical or initial entering into the memory of the computing component (O1-2).

The function of eye resolution dependence is determined as a function of the mode or the type of display information and subjective features of the user.

Ref. 19—Interrogation signals coding information on the boundaries of at least one sector of the video image (K1) and/or on the quality level of video image (K2), within which the requirements of the user's or the users' eye perceiving video image are met by generating the signals coding the user's eye dynamical characteristics taking into account the function of the eye resolution dependence in the computing component.

When the boundaries and quality levels of video image sectors are determined, the task of the minimum video data redundancy is solved by reduction of the video signal quality level down to the minimum level, when the user perceives the video image as a real image within the stated eye sectors. The quality level of video image sectors is minimized and dimensions of the video image sectors of a predetermined high level are reduced at the earliest possible stages of video signal formation, conversion, transmission or datainformation display.

According to the above-mentioned prior art, only one interrogation signal is formed, which is transmitted to the video signal forming component, video signal conversion component or to the display components (patent of Russia No. 2134053). We propose to generate at least two interrogation signals. FIG. 1, Ref. 20 shows the formation of individual interrogation signals for one video display components; Ref. 21 represents grouped interrogation signals for two or more information display component or summed interrogation signals obtained by addition of individual and/or grouped interrogation signals.

Ref. 22—An individual interrogation signal is transmitted to the information display component (O2-1) and/or to the conversion component (O2-2), and/or to the formation component (O2-3).

Ref. 14—The display component shows sectors of the video image taking into account interrogation signals with boundaries and quality levels corresponding to the interrogation signal of the display component (D2-1).

At the same time interrogation signals of the display facilities may be transmitted to the video signal conversion component connected with the above display components (O2-2), Ref. 23. Boundaries and/or quality levels of the video image, Ref. 12 are converted according to the interrogation signals in the conversion component.

Ref. 24—The summed interrogation signal is transmitted to the video component (O2-3). Video signals of video image sectors with its boundaries and quality levels within the stated sectors corresponding to the requirements of grouped users' eyes perceiving the video image are formed in accordance with the interrogation signal in the video components.

According to these interrogation signals the video signal sequentially reduces the data redundancy taking into account the requirement of a group of users gathered in front of one screen or a group of users, who simultaneously watch the video image on many screens. The above group may cover a building entrance, building, a street, a town, etc. The video signal sequentially reduces its redundancy down to the level corresponding to the eye requirement of one individual user taking into account individual faculties of his/her eye and its demand with the display of video image covering sectors with different quality level on the screen of the datainformation display components.

A video signal consisting of sectors with boundaries and a quality level corresponding to the grouped interrogation signal is formed in the information display components not taking into account interrogation signals from the the video signals received from the video components signal formation or conversion components. According to a prior art U.S. Pat. No. 4,028,725 a provision is made for the formation of control signals, i.e. signals formed taking into account the properties of a management object: a TV camera or a computer. In our case, interrogation signals, which characterize the faculties of users' eyes, are generated and transmitted.

As a result of the proposed method, one information display component or a group of information display components integrated by a common data channel, e.g., a feeder mounted in a building entrance, receives a summed data signal with the reduced redundancy of video information. Usually the users look at the same video item, therefore there exists a probability, that with the growth of the number of users being in front of one video display component, the volume of video information to be transmitted will grow in a non-linear dependence or will not be changed, as it is described in U.S. Pat. No. 4,859,050.

A video image with lowest redundancy is formed for users, whose eye characteristics are measured by means of sensors for whom an individual interrogation signal is generated in the computing component, whereas a grouped video signal received taking into account summed interrogation signals comes to the information display component without the sensors.

Simultaneous carrying out the above operations makes it possible to fulfill the assigned tasks.

All of the above characteristics are required and sufficient to solve the assigned task and to achieve the stated technical result.

2. A block diagram of the method of interactive foveal television and formation of interrogation signals in the computing component by stage is illustrated in FIG. 6. The above method is intended for employment data of eye individual features while generating the interrogation signals and to speed up the operation of generation of individual interrogation signals in the computing component (K1, K2) in case of a group of users perceiving a video item. This method is based on the eye feature, according to which the eye resolution from the vision line to the periphery goes down; consequently, the sectors of video image of a low quality level (Ref. 7) cover the sectors of high quality level (Refs 8 and 9).

Method 2M differs from method 4M by the following operations:

Ref. 27 (K1-1). Individual interrogation signals encoding information of at least about one boundary of at least one sector of the video image, which interrogation signals are generated in the computing component based on the signals coding eye dynamic characteristics taking into account a dependence function of the user's eye resolution (K1-1). An example of boundaries of video image sectors for different eyes for the same set of quality levels is depicted in FIGS. 2b and 2c, Refs 3 and 4. The above operation is done for a group of users' eyes with requests to be accounted in the process of operation of interactive television.

Ref. 28 (K1-2). An interrogation signal for users' groups coding the external boundaries of video image sectors of the same quality level (K1-2) is formed in the computing component by the stated interrogation signals for users and users' groups designed for several eyes and to code the boundaries of video image sectors. For this purpose the external boundary of the sector of video image of each quality level comprises external boundaries of all sectors of video image with the above quality level. An example of the boundaries of sectors of a video image for a summed request is shown in FIG. 2d.

The above method makes it possible to generate grouped interrogation signals corresponding to the requirements of every registered user perceiving a video image.

3. A block diagram of the method of foveal interactive television with sequential conversion of quality levels of sectors of video image is given in FIG. 7. It comprises the following steps:

Ref. 27 (K1-1). Individual interrogation signals encoding information on at least one quality level of at least one assigned sector of video image (K1-1) are generated in the computing component based on the signals encoding the eye dynamic characteristics taking into account the dependence function of user's eye resolution (L1). An example of quality levels of a video image conditionally assigned with a value from 1 to 3 for one set of sector boundaries of the video image shown in FIG. 3a, Ref. 6, for different eyes is shown in FIGS. 3b and 3c. The above operation is done for a group of users' eyes, whose requests will be taken into account in the process of operation of interactive television (K1-2).

Ref. 29 (K1-2). A sum interrogation signal encoding quality level in the sectors of video image with the highest quality level in any stated sector of the video image (K1-2) is formed in the computing component as per the stated individual interrogation signals designed for several eyes, which code quality levels of a video image in the stated sectors of the video image. An example of quality levels for the assigned sectors of a video image for a sum interrogation signal is shown in FIG. 3d.

1. A block diagram of the method 1Mof foveal interactive television with formation of interrogation signals by stage and interrogation signal transmission to an intermediate conversion component and/or to a information display component of claim 1 is shown in FIG. 8. We propose a variant, in which several information display component are used for one video component signal formation or a conversion component. This method comprising the steps of:

Ref. 11—transmitting the video signal provided for the lowest quality level of the entire video image from the video signal formation component via conventional signal channels of a conventional video broadcasting system directly to a plurality of display components, said plurality of display components including a number of user display components (D).

Ref. 20 or 21—Individual or grouped interrogation signals of the information display component, coding boundaries of sectors of the video image respectively (K1-2) are generated in the computing component for one user's or for a group of users' eyes perceiving a video image (E) on one screen of a video display component.

Ref. 22—The above interrogation signals are transmitted to the information display facility or to the video information conversion component connected with the information display component (O2-1).

Ref. 30—A sum interrogation signal (K1-2) is formed in the computing component by two or more requests of a data information display component of a group of information display components.

Ref. 23 or 24—Stated interrogation signals of a group of information display component are transmitted respectively to the conversion or formation component connected with a group of information display component (O2-2, O2-3).

Method 3M in the reviewed variant makes it possible to use intermediate signals for the formation of interrogation signals for the information display component and/or video signal conversion components, which saves the time of interrogation signal transmission to the information display components and video signal conversion components, which are connected with them.

5. To minimize the amount of computations in an individual computing component with simultaneous reduction of the traffic of interrogation signal transmission and to reduce the number of the data channels for signal transmission from the sensors to the computing components, we propose the method with distributed interrogation signal generation in separate computing components. The block diagram of the variant of implementation of foveal interactive television of 3 is shown in FIGS. 9 and 10.

Ref. 27 or 29 and Ref. 28 or 30—Interrogation signals are generated according to the proposed method for the users' eyes perceiving video information from one information display component in one computing facility (K3-1/K3-2). Interrogation signals of the information display component encoding the boundaries of sectors and/or the quality level in the stated sectors of a video image are generated in the above computing component.

Ref. 31—Received interrogation signals of the information display components are transmitted to the information display components (FIG. 9) or to the video signal conversion component (FIG. 10) connected with the above stated information display component; interrogation signals are also transmitted to the computing component connected with video signal conversion or formation components for a group of components, which is included into the stated information display components (O3-1).

Ref. 28 or 30—A sum interrogation signal of a group of information display component (K4) is formed in the computing component by interrogation signals from a group of computing components.

Ref. 32—A sum interrogation signal is transmitted to the video signal conversion component or to the video signal conversion or formation components connected with the above computing component; the interrogation signals are also transmitted to the computing component, connected with the video signal conversion or formation components for a group of component, to which a display component is included (O3-2).

The proposed variant of implementation of an independent method makes it possible to separately process signals coming from the eye characteristic sensors or interrogation signals received in the previous stages.

Figure 11A:
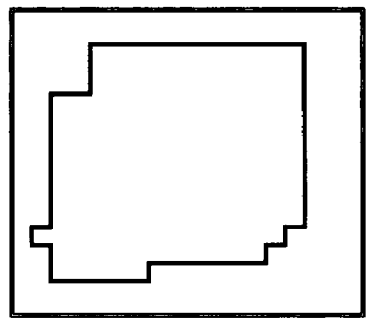
Figure 11E:
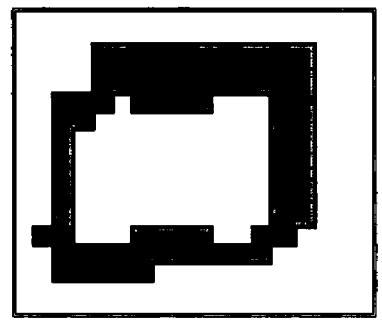
Figure 11B:
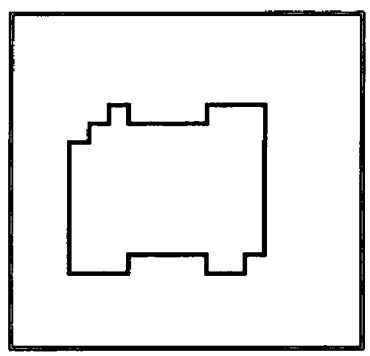
Figure 11F:
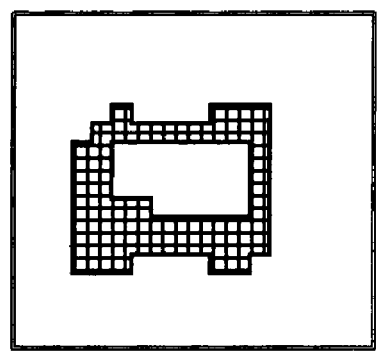
Figure 11C:
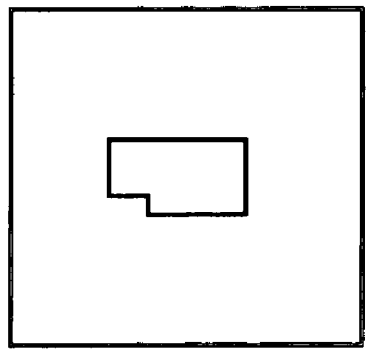
Figure 11G:
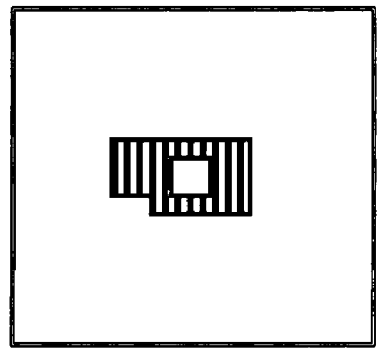
Figure 11D:
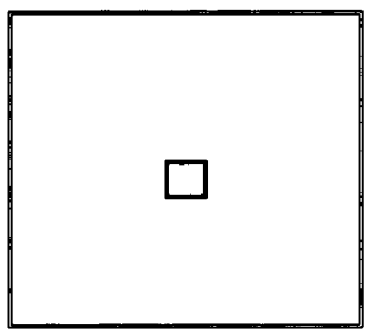
Figure 11H:
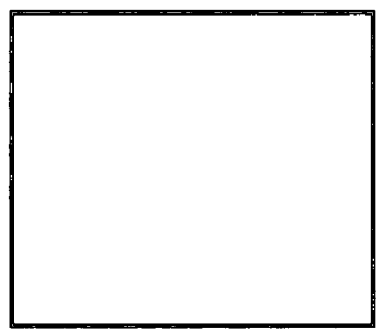

6. When an independent method 3M is implemented in case of a bulk network of video signal distribution, it is necessary to convert in parallel quality levels of the same sectors of a video image transmitted to the video signal conversion components. When the interrogation signals are transmitted from users' information display components to the conversion and formation components, the interrogation signals of video image sectors are summarized in the computing components. In this connection, video image sectors are expanded as it is shown in FIGS. 11a, b, c, d. Video signals of the video image sectors of a high quality level are converted into a video signal of a low quality level in every video signal conversion facility, as shown in FIGS. 11f, g, h which increases the requirements for computation capacity of the video signal conversion components. A block diagram of the method of foveal interactive television with a one-fold preliminary conversion of the quality level and sequential conversion of sector boundaries of a video image is shown in FIG. 12. It additionally includes the following operations:

Ref. 33—A video signal of the video image of a low and at least the same high quality level (A3/C4) is formed or converted in a series of video signals of the video image in the video signal formation components or in the primary formation component.

Ref. 34—A video signal of an assigned quality level with boundaries corresponding to the interrogation signal (C5) is extracted from the video signal of the sector of video image corresponding to the quality level in the video signal conversion component, taking into account the signals encoding boundaries of video image sectors for every high quality level of a video image.

Ref. 10—Received video signals of high quality levels are transmitted at least to one component of video signal conversion or to one information display component (B2).

Ref. 11—Video signals of the sectors of a video image are transmitted to the video signal conversion component (B).

Ref. 35—the internal boundaries of every sector of a full picture video image are converted in the video signal component, except for the highest level, according to the external boundaries of sectors of video signals of a high quality level relatively to a video signal of the current quality level (C6).

7. Video signals of all quality levels except for the lowest level, according to the method 5M, or 6 reduce their area at the instance of their transmission from the source of video information to the user in the course of the sequential conversion, whereas the sector of video image with the lowest quality level in the datainformation display components achieves 90-99% of the video image area. A block diagram of the method with the transmission of video signals of the lowest quality level is illustrated in FIG. 13. The method 7M comprises the following operations:

Ref. 36—Received video signals of the lowest quality level are fully transmitted to all signal conversion components directly connected with the information display components, and directly to the information display components.

Ref. 37—Only video signals of sectors of a video image of high quality are transmitted to the signal conversion components connected with information display components (B3).

Ref. 38—The internal boundaries of every sector of a video image of a low level are converted in the video signal conversion component directly connected with the information display component in accordance with the external boundaries of video signal sectors of a high quality level for the given video signal (C7).

Ref. 39—A video image is formed in the information display component, and the user perceives it without foveal interrogation signals corresponding to the function of the eye resolution of the individual user.

8. Should the quality levels of video signals of low and high quality levels occur to be characterized by the fact, that an element of a video image (pixel) of a video signal of a low quality level restricts the entire quantity of video signal elements of a high quality level of the video image, we propose the method 3M, which differs by the fact that the element of video information (pixel) of a video signal with the low quality level is determined in the components of video signal formation or in the video signal conversion components as an average value of video information elements (pixels) of the video signal of the high quality level, which signal includes a video image sector restricted with the boundaries of the above pixel of the video signal with low quality level (I1).

9. To simplify computations in the computing component, we propose the method 3M, which differs by the fact that one of elements of the video image (pixel) of high level covered by the above element of video image (pixel) of the video signal of low level (I2) is used as an element of video information (pixel) of the video signal of low quality level.

10. The method 10M allows further increasing the amount of video information transmitted through data channels of the data transmission component, because the video signals with a low quality level of a video image partly back up video information contained in the video signals of a higher quality level. To overcome this disadvantage, we propose the additional method 10M, which differ by the fact, that the video signal of the lowest quality level is identified as a basic signal. A video signal of a first expansion level is formed or converted by summation of the basic video signal and the video signal of the expanded quality level so that it allows generating a video signal of a first high quality level. A video signal of a second high expanded quality level is formed or converted by summation of the video signal of the basic level and video signals of the first and second expanded quality levels.

Therefore, the methods and the components, of video signal formation and conversion, in which the above conversion is done without interrogation signals, have been described above. According to the algorithm built in in the formation or conversion or components, the initial video signal is divided into several video signals, which mutually complement each other. It is possible to use a of video signal formation component or component similar to that one presented in "Technique used in cinematography and television", 1999, 1 p. 21, "Operating procedures of studio cameras and TV—systems in the age of digital television", Part 2. Camera technique for HDT. L. J. Torp, Sony Corp., whereas a video signal conversion component or component, similar to that one described in "Digital processing of TV and computer images" edited by Y. B. Zubarev and V. P. Dvorkovich, Moscow, 1997, in scheme 8.6 coder of video signal presents the process of initial video signal conversion into video signals with two scales of spatial resolution: a video signal of basic level and a video signal of expanded level. For the inverse conversion of video signals a provision is made for the conversion in a conversion component or component connected with a particular information display or component: such as a—decoder, which is used for summation of video information of the basic video signal and every expanded video signal into relevant video signals of the assigned series of quality levels for each sector of the video image. A block diagram of the method 10M is shown in FIG. 15. It differs with respect to the most similar methods 3M and 8M by the following operations:

Ref. 40—A video signal is generated in the video signal formation component, or converted in the video signal conversion component into a series of video signals of the video image of the basic or at least one expanded quality level (A6/C10-1).

Ref. 41—Video information of the basic quality level and expanded quality level (S) is summed in the video signal conversion component to obtain a series of video signals of different quality levels.

12M. It is convenient to process distributed signals by cutting the sectors with boundaries assigned by the interrogation signal in the video signal conversion component from the video signals of expanded level. When signals come to the video signal conversion component connected with a particular information display component, the values of video signal pixels are added to the entire video frame or only to the sector of high quality level, for example, as per method K-1, according to which the pixel color grade signal of high level is added, the mean value of color grade of super pixel is multiplied by K, whereas the color grade of the last K-pixel will be equal to the difference between the sum and the product. A similar approach is possible, when video signals of the basic and expanded levels differ by a signal/noise ratio, a frequency of frame change, a color grade and other characteristics of the quality level of the video image. It is also possible to use the variant when giving up calculation of sums, products and differences, and the pixel color grade of low level taken as the color grade of one of K-pixels of the initial level to be selected in a specified sequence similar for each group of K-pixels, either in a different way or at random. When a video signal of high level is summed for a entire video image or only in the sector of high level K-1, a pixel comes from the video signal of the expanded level, whereas one pixel comes from the basic level signal.

13. To simplify calculations, we propose to use the signal of one of pixels of video image of the initial quality level covered by the pixel of low quality level for the formation of a video signal pixel of low level.

As an example of the process of video signal conversion of a video image of a series of quality levels into the basic and expanded quality levels of the video signals without taking into account the interrogation signals, we propose the method of 13M, which differs by the fact that the signal of a quality level lower than the initial signal is generated by way of data summation of several (K) of the nearest pixels of the initial video signal and division of the sum into a number of pixels into one pixel of the video signal of low level. For example, the color grade of several pixels is added and divided by the number of summed pixels (K). Once all pixels of the video signals of the initial level being processed, a video signal of the whole frame of low level and respectively of the low size is obtained. On the other hand, the video signals of K-1 pixels of the initial level are transmitted to the generated video signal of high level. A similar procedure may be repeated by the number of quality levels of video signals minus 1. The summarized quantity of information for all video signals will not be greater than the volume of video signals of the high quality level with boundaries corresponding to the boundaries of the video image.

The video signal of the basic level comes through the data channels to all of the user information processing display components, including the display conversion components.

The above method may be used jointly with the effective video standards such as PAL, SECAM, NTSC in the event when standard signals distributed in the networks or on air are used as the basic video signal, whereas the expanded signals are distributed through separate data channels.

14. For example, when the interrogation signal is identified at the stage of its formation or conversion, whereas the determined sectors cover the entire frame of the video image, in such a case during fulfillment of the transmission operation it is possible to adjust and contain not all sectors, i.e. only the sectors of the highest quality of video image, during operation of the interrogation signal transmission it is possible to adjust and contain not all sectors, i.e. only the sectors of the highest quality of video image so that they could be transmitted in due time to the information display component, which are viewed in real time for the time being. The other sectors, having a quality level lower than that one of the previous level or with other boundaries, or which are not transmitted at all depending on the load and the state of the data transmission component, as well as the critical time for transmitting of the video image stream with the eventual further recovery of the interrogation signal to the previous level.

15. The method 21M, which differs by the fact that the video signals of sectors of the video image are recorded in advance with the initial quality level (A9-1), whereas every sector of the video image with a quality level assigned by the interrogation signal is displayed in the video signal formation component. To do so, the video signals of video image sectors with an initial quality level are recorded on the medium in parallel with the data record in parallel addresses; several sectors of data medium are read off in parallel in the video signal formation component at the time of video signal display with the initial quality level, when displaying the video signals of the low level, a part of the video signals (A9-2) is real off in parallel.

EXAMPLES OF APPLICABILITY

With a view to demonstrate the applicability of the proposed method of interactive television using eye foveal faculties of individual and grouped users and for the demonstration of the achievement of the assigned technical result we shall compare the existing TV method and the proposed method of interactive television using eye foveal faculties of individual and grouped users for the resolution of the task of HD TV broadcasting.

When using the method proposed by the authors let us consider a variant, according to which video signals are formed by means of similar facilities of video signal formation, i.e. HD TV cameras. Video signal of all video images is converted into a series of video signals of different quality level according to the dependent method 3M. Let us assign three quality levels: the first one—the lowest quality level of video image corresponding to SECAM standard (625*625 pixels in a frame), first high quality level corresponding to spatial resolution (1250*1250 pixels in a frame), which by 2 times is more than the spatial resolution of SECAM standard, the second high quality level corresponds to the resolution of the compare high definition television (HD TV) (2500*2500 pixels in a frame), which by 4 times more, than the spatial resolution of SECAM standard.

Suppose that the existing and the proposed methods are applied in the following TV system, in which:
  users simultaneously watch video image of the same video item, formed by video display component (Refs. 13 and 14);
  at the same time on the average two users watch one information display component (first level, 2 users);
  every 10 video display components are located in one entrance of a building and are connected to one entrance facility of a video signal transmission component (second level, 20 users);

every 10 entrance of a building are connected with a common building facility of video signal transmission components (third level, 200 users);

every 10 buildings are connected by data channels with street facilities of video signal transmission component (4to level, 2,000 users);

every 10 streets are connected by data channels with video signal transmission component of residential quarters (5to level, 20,000 users);

every 10 residential quarters are connected by data channels with regional facility of video signal transmission components (6to level, 200,000 users);

every 10 regions are connected by data channels with the urban facility of video signal transmission components (7to level, 2,000,000 users).

Assume, that in case of both TV methods the users are located at a distance of 3 m from the screens located in the perpendicular plane to the eye optical axis and have the size of diagonal 57 cm with side ratio 3 to 4. Taking into account the function of a sound eye resolution, the projection diameter of the foveal area to the video image with the spatial resolution on the external boundary corresponding to the resolution of the TV video signal of the lowest quality level will not be higher than 128*128 pixels, whereas that one of the second high quality level will not be higher than 64*64 pixels. Spatial resolution of the video image formed in the information display component of the transmitted video signal for both considered methods in an sector with a 1 cm diameter will be lower than the spatial resolution of the user's eye. Thus, both methods form video images of similar pectoral quality level.

Let's identify the volumes of information of video signals transmitted through data channels from facilities of video signal formation to information display facilities according to the existing method of the cabled TV broadcasting.

| | |
|---|---:|
| Number of lines, pcs | 2,500 |
| Number of pixels in a line (number of columns), pcs | 2,500 |
| Volume of video information of one pixel, byte | 2 |
| Volume of video information of one frame, Mbytes | 12.5 |
| Image frequency, frame/s | 24 |
| Volume of video information transmitted through every data channel of HD TV, Mbytes/s | 300 |
| Length of a TV channel from the information display facility to the access TV channel, m | 10 |

Data channels of the lowest level are connected to the data channels of an entrance of the building, a building, a street, a residential quarter, a region or a town in an arbitrary point.

| | |
|---|---:|
| length of a TV channel of an entrance of the building | 50 |
| building | 200 |
| street | 1,000 |
| residential quarter | 3,000 |
| region | 5,000 |
| town | 10,000 |
| The aggregate traffic of data transmission from the entrance TV channels to the information display facilities, Mbytes*km/s | 3,000,000 |
| The aggregate traffic of data transmission in all in-entrance TV channels, Mbytes*km/s | 1,500,000 |
| in-building, | 600,000 |
| in-street | 600,000 |
| in-quarter | 150,000 |
| within a region | 45,000 |
| in-town | 30,000 |
| The aggregate traffic of data transmission through all data channels of HD TV, Mbytes*km/s | 5,508,000 |

Let's determine the volume of information transmitted through the data channels in the TV broadcasting system according to the methods proposed by the authors.

Unlike the existing method of TV broadcasting, the method proposed by us additionally provides the dynamic feedback of quality level control in video image sectors for individual and grouped users. Let's determine the volume of information of interrogation signals transmitted through data channels.

When the stated method 3M is used, the sensors connected with the information display component determine the eye dynamic characteristics with respect to the video image formed by this information display component (Ref. 16)(N). For example, signals and their coding signals are dynamically formed as described in Russian Federation patent No. RU2134053 using coordinates and orientation of the eye optical axes with respect to the video image formed by the information display component using the method and components described in a USSR inventor's certificate as of 1959 and further, in US patents as of 1983 and in more recent patents. The signals coding eye coordinates with respect to the video image are dynamically transmitted to the computing component (Ref. 18)(O).

The signals coding the boundaries of video image sectors of the first high quality level and the second high quality level (Ref. 27) (K1-1) are generated in the computing component according to method 3M for each eye taking into account the dependence function of the eye resolution (K). For instance, the boundaries may be assigned by the coordinates of centers (FIG. 2, Refs 45, 46, 47, 48) of a broken line (Ref. 49) enveloping a sector of the first increase quality level of the video image (Ref. 50). Coordinates of the points are assigned in the coordinate system connected with the boundaries of the video image sector of the lowest quality level by natural numbers within the range of 1-625. In this case, the accuracy of the boundary identification is equal to the resolution of the lowest quality level and, consequently, an eye cannot distinguish this boundary. The first point (Ref. 45) is assigned by two coordinates X1 and Y1, in aggregate with 22 data bits. The coordinates of the second point (Ref. 46) may be assigned by the value of coordinate Y change. When shifting from the point Ref. 45 to the point Ref. 46, the second coordinate is not changed. The coordinate of the third point is assigned by the value of change of coordinate ?X when shifting from point Ref. 46 to point Ref. 47. In this case coordinates Y are not changed. On the basis of the geometric features of a rectangle, the forth point of the boundary between the sector of the low quality level and the sector of the first high quality level is plotted.

Assigning the highest size of the sector of the first high quality level to horizontal delta X ?? and to vertical ?deltaY up to $128=2^7$ pixels of the video image of low quality level, in order to assign coordinates of the second point and every further point, 7+1 data bits will be required. Coordinates of the broken line (Ref. 49) comprising the sector of video image of the first high quality level (Ref. 50) will be assigned fully, when the coordinate of the further point will coincide with the coordinate of the initial point (Ref. 46). Let's assign the simplest form of a broken line comprising a sector of video image of the first high level, i.e. a rectangle; in this connection the aggregate interrogation signal of the first high quality level of one information display component to one eye will be 22+2*8=38 bits/frame/eye.

Having assigned coordinates of the first point (Ref. 51) of a broken line (Ref. 52) comprising a sector of the second high level with respect to the first point of the first broken line (8+8=14 bits/frame), and assigned a maximum size of the sector of the second high quality level to the horizontal and to the vertical, which do not exceed 64 pixels of video image of the lower level, the interrogation signal encoding the boundaries of the video image sector of the second high level for one eye will be equal to 14+2*6=28 bits/frame/eye.

The interrogation signals encoding the boundaries of video image sectors of the first and the second high quality level for the user's eye will not exceed 24*(38+16)=1296 bits/s for a information display component used for one user with a frame frequency of 24 frames/s.

Then, an aggregate interrogation signal (Ref. 28) (K1-2) encoding the boundaries of video image sectors of the first quality level for the case, when projections of the eye optical axes of two users are distributed over the video image surface with the same probability, is generated in the computing component according to method 3M covering the boundaries of sectors of the first high level of video image of every eye perceiving a video image.

For the 24 frames/s frequency, the interrogation signals encoding the boundaries of video image sectors of the first and second high quality levels of one information display component for four eyes will be equal to 4*1296/8=648 bytes/s.

According to method 10M the interrogation signals generated for one eye or for several eyes of users (FIG. 9, Ref. 27/29 or 28/30) are transmitted to the information display components and to the computing components of a higher level (Ref. 31).

Let's calculate the maximum size of the interrogation signal generated for an urban component of the video signal formation components, according to method 1M. Let's determine the number of video image sectors equal to the number of pixels of the video image of the lowest quality level. In this case:

| | |
|---|---|
| Number of quality level, pcs | 3 |
| Number of bits for assigning quality level of one pixel, bit | 2 |
| Frame frequency, Hz | 24 |
| Volume of quality level interrogation signal of video frame sector, Kbytes/s | 2,343 |

The calculated interrogation signal for all users of a town will have the maximum value. We calculate interrogation signal traffic transmitted through the data channels for intermediate levels taken as reference an exponential growth of the interrogation signal traffic of the number of users' eyes.

The peculiarity of the proposed method consists in the fact that the data channels of interrogation signal transmission of each level are connected into a "star".

| | |
|---|---|
| Length of TV channel from the information display facilities to the entrance computing facility, m | 60 |
| building | 200 |
| street | 1,000 |
| residential quarter | 5,000 |
| region | 10,000 |
| town | 15,000 |
| The aggregate traffic of interrogation signal transmission through all data transfer channels from every information display facility to in-entrance computing facilities, Mbytes*km/s | 15.23 |
| in-building | 19.89 |
| in-street | 38.97 |
| in-residential quarter | 76.34 |
| within a region | 59.82 |
| in-town | 35.15 |
| The aggregate traffic of interrogation signal transmission according to the proposed method amount to, Mbytes*km/s | 245.4 |

Let's determine the volume of video information transmitted through the data channels from the component of video signal formation to the information display components in accordance with the stated method. According to method 10M, the video signals: are formed and/or converted into video signals: of the basic level, the first extended level, and the second extended level.

The volume of the video signal of the basic quality level according to the proposed method 11M corresponds to the method of SECAM video signal transmission and corresponds to $\frac{1}{16}$ of the volume of HD TV signal.

The aggregate traffic of video information transmission of the video signal of basic quality level SECAM for

| | |
|---|---|
| all in-entrance TV channels, Mbytes*km/s | 187,500 |
| in-building | 112,500 |
| in-street | 18,750 |
| in-residential quarter | 5,625 |
| with a region | 938 |
| in-town | 188 |
| The aggregate traffic of video information transmission for all data channels of HD TV, Mbytes*km/s | 344,250 |

According to the stated method 11M the structure of video signal distribution of expanded quality levels corresponds to the above-considered structure of interrogation signal, and the structure of video signal distribution of basic quality level corresponds to the structure of HD TV distribution structure.

Let's determine the traffic of video information of the first and second expanded quality levels to be transmitted to one information display component of the stated method 12M taking a video image sector shape as rectangular and the number of eyes simultaneously perceiving the video image formed by one screen of the information display component as equal to 4 (two users watch video item simultaneously).

| | |
|---|---|
| Volume of video information of one frame of video signal window of the first high quality level, bytes | 32,768 |
| Volume of video information of one frame of video signal window of the second high quality level, bytes | 8,192 |
| Volume of video information of one frame of video signal window of the first expanded quality level, bytes | 24,576 |
| Volume of video information of one frame of video signal window of the second expanded quality level, bytes | 7,680 |
| Volume of video information of the first the second expanded quality level of video image perceived by two eyes of a user, Kbytes | 65 |

Let's determine the maximum traffic of video signals of the first and second high quality levels formed or converted in an urban TV center (Ref. 36) (A6-1/B10-1) on the basis of the fact that the points of vision of all users cover the whole video image in a regular way.

The volume of video signals of the first and second quality level formed or converted in accordance with method 11M will amount to $^{15}/_{16}$ 300=281 Mbytes/s.

Video signals of such traffic are transmitted to the regional components of video signal conversion (Ref. 10) (C1). The boundaries of video image sectors of the expanded quality levels are converted in the video signal conversion component in accordance with the aggregate interrogation signal used for 100,000 users; in this connection, the aggregate signal traffic is reduced by the value, which mainly depends on the video item and the diversity of the users' reaction. Suppose, that the reduction is equal to 1%.

For the case of the reduction of the video information volume in every sequential level, we may assume, that it is approximated by an exponential function.

The aggregate traffic of video information transmission of the video signal of the extended quality levels for all in-entrance

| | |
|---|---:|
| TV channels will be, Mbytes*km/s | 1,206,999 |
| in-building | 1,014,317 |
| in-street | 753,960 |
| in-residential quarter | 490,007 |
| in-region | 119,883 |
| in-town | 20,763 |
| The aggregate traffic of video signals of basic and expanded quality levels and interrogation signals for the proposed method will be, Mbytes *km/s | 3,261,902 |
| The aggregate traffic of video information transmission through all data channels of HD TV according to the above calculations will be, Mbytes*km/s | 5,508,000 |

The above value is essentially lower than the traffic of video signal transmission of high definition according to the existing methods.

The above disclosure demonstrates the fulfillment of the stated technical result by the independent methods as well as some dependent methods with regard to the reduction of the transmission traffic, reduction of the highest stream of video information, compatibility of new TV standards with the existing TV standards and data channels, possibility of work at a long distance from the source of video information. Owing to the fact, that the restricted volume of information is transmitted through the data channels of lower levels, the produced frame is not important for the other users.

According to this example all figures are given for the case when a video signal packing as per methods JPEG, MPEG-1, 2, 3, 4 or any other methods are not used.

Use of the video signal packing jointly with the proposed method will result in the reduction of absolute values of the signal streams but will preserve their ratio and advantages of the proposed method.

Obviously, numerous modifications and variations of the present invention are possible in light of the above teachings. It is therefore to be understood that within the scope of the appended claims, the invention may be practiced otherwise than as specifically described herein.

Further, the present application incorporates by reference the following papers, reports and technical disclosures:
1. "An eye and its function", S. V. Kravkov, AS of the USSR, 1950.
2. "Principles of display apparatus configuration in automated systems" I. I. Litvak, B. F. Lomov, I. E. Soloveychik.
3. "Hardware of graphic data input-output" edited by Tchetverikov, series from seven volumes "Organization of a man interaction with hardware of ACS", volume 3.
4. "Work with display Units. Abstract book from the Third International Scientific Conference on Work with Display Units/1992"
5. "Cinematographic and TV engineering", 1999, 1
6. Operating procedures of studio cameras and TV-systems in the age of the digital television. Part 2. Camera technique for HD TV. L. J. Torp, Sony corp.
7. "Digital processing of TV and computer images" edited by Y. B. Zubarev and V. P. Dvorkovich, Moscow, 1997.
8. "Digital TV equipment—Philips Digital Video Systems", V. V. Bykov, journal "Tekhnika kino i televideniya", No. 1 1999.
9. "Operating procedures of studio cameras and TV-systems in the age of digital television. Part II. Operating procedures of cameras for HD TV. L. J. Torp, Businnes and Professional Group, Sony Elektronics Inc., journal "Tekhnika kino i televideniya", No. 1 1999".
10. "Image of super high definition on a huge screen", Eidzo dzeho media gakkay si, 1998, v. 52, No. 7, published in journal Tekhnika kino i televideniya", No. 1 1999".

What is claimed is:

1. A method of interactive television wherein video signals are generated based on real time user perception of video images comprising the steps of:
forming a video signal of an entire frame of an initial video image in a video signal formation component, said initial video image has a predetermined quality level and predetermined dimension;
said initial video image is divided into a plurality of sector video images with predetermined boundaries, said sector video images having the same predetermined quality level;
converting the video signal of said initial video image in a video signal transmitter conversion component into a series of sector video signals corresponding to said sector video images;
transmitting said sector video signals from said transmitter conversion component via data channels, via a plurality of group user intermediate conversion components, to a plurality of user display components, said intermediate conversion components are substantially connected to said user display components;
converting said quality levels of said sector video signals, such that a corresponding quality level of at least one said sector video image is successively reduced, said conversion is provided in said group user intermediate conversion components;
forming an entire frame video image on the user display component, said user display component is connected to one group-user intermediate conversion component chosen from said plurality of group-user intermediate conversion components, said forming is based on said sector video signals, said entire frame video image being perceived by at least one user; said sector video images having the same predetermined boundaries and dynamically changeable quality levels;
determining eye characteristics of a user by employing at least one sensor in operative communication with one eye of the user, said eye characteristics are determined relatively to the entire frame video image formed by the user display component and perceived at an eye of said user, and by employing data from said sensor to dynamically establish coding characteristics of each user;
generating display interrogation signals within a plurality of computing components of a first type, each of said first type computing components is connected to a predetermined display component chosen from said user display components, taking into account an eye resolution of a corresponding user, and said coding characteristics;

said display interrogation signals containing information on the quality levels of at least one sector of the video image;

transmitting said display interrogation signals to one of a plurality of computing components of a second type, connected to said group-user intermediate conversion component;

transmitting said display interrogation signals immediately to said user display component;

generating a plurality of group interrogation signals within a plurality of computing components of the second type, said group interrogation signals are generated based on the display interrogation signals of at least one computing component connected to a corresponding computing component of the second type;

calculating said quality levels of the sector video image within said second type computing components, in this connection, the quality level of said sector video signals is set as the highest quality level for the respective sectors of the video images corresponding to said display interrogation signals;

converting the quality levels of said sector video signals, such that a corresponding quality level of at least one said sector video image is reduced, said conversion is provided in said group-user intermediate conversion component;

wherein, said group interrogation signals are taken into account with a respective concurrent adjustment in converting said video signals; and said forming of the entire frame video image on said user display component, based on said sector video signals, is controlled by said display interrogation signal of said corresponding user.

2. A method of interactive television wherein video signals are generated based on real time user perception of video images comprising the steps of:

forming a predetermined number of video signals of an entire frame of an initial video image with different predetermined quality levels, including a lowest quality level and a number of higher quality levels, in a video signal formation component; said initial video image is characterized by predetermined boundaries, said boundaries include external boundaries;

transmitting the video signal provided for the lowest quality level of the entire video image from the video signal formation component via conventional signal channels of a conventional video broadcasting system directly to a plurality of display components, said plurality of display components including a number of user display components;

transmitting said video signals of the higher quality levels from the video signal formation component via data channels, via a plurality of intermediate conversion components, to said display components; said intermediate conversion components are substantially connected to said user display components;

changing said boundaries of said video signals of the higher quality levels in the intermediate conversion component; said changing results in formation of a number of areas of each said video signal, wherein the boundaries of at least one of said video areas are narrowed;

forming the entire frame video image on a user display component, chosen from said plurality of user display components, said user display component is connected to a group-user intermediate conversion component chosen from said plurality of intermediate conversion components; wherein said forming is based on the video signal of the entire frame video image of said lowest quality level, and on the video signals of said higher quality levels;

perceiving the entire frame video image by at least one user;

determining eye characteristics of the user by employing at least one sensor in operative communication with one eye of the user, said eye characteristics are determined relatively to the entire frame video image formed by the user display component and perceived at an eye of said user, and by employing data from said sensor to dynamically establish coding characteristics;

generating a plurality of display interrogation signals for one of said display components, said generating is provided in one of the first type computing components, said display interrogation signals provide coding said boundaries, taking into account the eye resolution and dynamically establish coding characteristics of the eyes of users of the corresponding display component, said dynamic characteristics are determined in relation to the video image, and taking into account the characteristics of said predetermined quality levels;

said display interrogation signals containing information on the external boundaries of at least one area of the video image with one of the predetermined quality levels;

transmitting said display interrogation signals to a plurality of computing component of a second type, connected to said group-user intermediate conversion component;

transmitting said display interrogations signals immediately to said user display component;

generating a plurality of group interrogation signals within a plurality of computing components of the second type, said group interrogation signals are generated based on the display interrogation signals of at least one computing component connected to a corresponding computing component of the second type;

calculating said external boundaries of the area video image within said second type computing components, in this connection, coding said external boundaries of said areas of an equal quality level for said users or said group of users, the external boundaries of each said quality level include the external boundaries of all said areas with predetermined equal quality levels for the respective levels of the video images corresponding to said display interrogation signals;

wherein said changing of said boundaries of said video signals of the higher quality levels is controlled by said group interrogation signals, taken into account with a respective concurrent adjustment in converting said video signals; and said forming of the entire frame video image on the user display component, based on said area video signals, is controlled by said display interrogations signals.

3. The method of claim 2, wherein said forming video signals is provided for said different quality levels, and further comprises:

changing the boundaries of each said area of the video image in the intermediate conversion component except for the area of the highest quality level, said boundaries including internal and external boundaries, the internal boundaries of all the areas, except the highest quality level area, correspond to the external boundaries of the video image with the next higher quality level.

4. The method of claim 2 wherein said forming the video signal of the entire video image of a predetermined low quality level in the video signal formation component further comprises: calculating a value of a pixel of the video image of said low quality level as the mean value of values of pixels of a predetermined high quality level of the video image, wherein said pixel has predetermined boundaries, said pixels of a predetermined high quality level of the video image are restricted with the boundaries of said pixel of the predetermined low quality level.

5. The method of claim 2, wherein said forming the video signal of the entire video image of a predetermined low quality level in the video signal formation component further comprises: calculating a value of a pixel of the video image of said low quality level as a value of a pixel of a predetermined high quality level of the video image, wherein said pixel of the video image of said low quality level has predetermined boundaries, said pixel of the predetermined high quality level of the video image is located inside of said pixel of the predetermined low quality level.

6. The method of claim 2, wherein said user display component is represented by a conventional CRT including: a screen, a gun-cathode, an electronic beam deflector, a size screen dot unit for dynamic control of the dot on the screen; said method further comprises:
successive transferring video signals of said areas with different quality levels to the gun-cathode;
synchronous transferring said display interrogation signals for said areas each, wherein said display interrogation signals carry encoding information on the boundaries of said each area, said transferring the display interrogation signals is provided to said electronic beam deflector, said synchronous transferring of said display interrogation signals is provided synchronously with the entire frame video image; and
synchronous transferring said display interrogation signals for said areas each, wherein said display interrogation signals carry encoding information on the quality levels of said areas, and said transferring the display interrogation signals is provided to said size screen dot unit, said synchronous transferring of said display interrogation signals is provided synchronously with the entire frame video image.

7. A method of interactive television wherein a video signal is generated based on real time user perception of video images comprising the steps of:
forming a video signals
of an entire frame of a video image, and/or forming video signals
of sectors of said video image with substantially equal quality levels and predetermined boundaries, or
an entire frame of a video image with different quality levels, in a video signal formation component;
converting the video signals at least one time in at least one video signal conversion component into a series of video signals of the video image sectors and/or
converting the level of quality of the video image sectors, and/or
changing said predetermined boundaries of said sectors,
transmitting said video signals via data channels, at least, to one said conversion component and to at least one display component,
forming a video image on the display component, said video image being perceived, at least, by one user,
determining eye characteristics by employing at least one sensor in operative communication with one eye of the user, said characteristics are defined relatively to the video image formed by the user display component and perceived at an eye of said user, and by employing data from said sensor to dynamically establish signal coding characteristics,
transmitting said signals having said coding characteristics to at least one computing component;
generating interrogation signals with said computing component, taking into account the eye resolution, communicated in the coding characteristics, said interrogation signals include a first category containing information on the boundaries of at least one sector of the video image and/or a second category containing information on the quality levels of at least one sector of the video image;
transmitting said interrogation signals to at least components of the following types: said formation component, said conversion component, and said display component;
wherein:
the interrogation signals are taken into account with a respective concurrent adjustment in forming of said video signals, converting said video signals, and forming said image;
said forming video signals is provided for said different quality levels, and further comprises:
transmitting said video signals via data channels, at least, to one said conversion component,
subjected to said first category interrogation signals, changing the boundaries of each sector of the video image in the conversion component except for the sector of the highest quality level, said boundaries including internal and external boundaries, the internal boundaries of all the sectors, except the highest quality level sector, correspond to the external boundaries of the video signal with the next higher quality level;
the first quality level corresponds to a basic level;
said transmitting the video signal is provided for the basic level of the entire video image via data channels of a conventional video broadcasting system to every said display component directly, or via the conversion component, associated with the display component; and
subjected to said interrogation signals containing at least information on the boundaries of a sector with the lowest quality level, changing the internal boundaries of each sector of the video image in the conversion component.

8. The method of claim 7, wherein said forming the video signal of the entire video image or the video signals of said sectors of the video image of a predetermined low quality level in the formation component further comprises: identifying a value of a pixel of the video image of said low quality level as the mean value of pixels values of a predetermined high quality level of the video image, wherein said pixels values forming a part of the video image sector, restricted with the boundaries of said pixel of the predetermined low quality level.

9. A method of interactive television wherein video signals are generated based on real time user perception of video images comprising the steps of:
forming a predetermined number of video signals of an entire frame of an initial video image with different predetermined quality levels in a video signal formation component; said initial video image is characterized by predetermined boundaries; said different predetermined quality levels include a number of quality levels starting from a lowest first quality level, the number of quality levels includes a second quality level corresponding to a first extended quality level, a third quality level corresponding to a second extended quality level, and so on; said forming a video signal of the first extended quality level in the video signal formation component further comprises: subtraction of the first quality level video signal from the second quality level video signal whereas said forming the video signal of the second and higher numbers extended quality levels are obtained by subtraction from the respective quality level video signal of a video signal with the next quality level;

transmitting the video signal provided for the lowest quality level via conventional signal channels of a conventional video broadcasting system directly to a plurality of display-conversional components, each said display-conversional component is connected to a corresponding said user display component;

transmitting said video signals of the extended quality levels from the video signal formation component via data channels, via a plurality of intermediate conversion components, to said display-conversional components, said intermediate conversion components are substantially connected to said display-conversional components;

changing said boundaries of said video signals of the extended quality levels in the intermediate conversion component; said changing results in formation of a number of areas of each said video signal, wherein the boundaries of at least one of said areas are narrowed;

summarizing the video signals of the lowest quality level and of all of the extended quality levels, thereby obtaining a summary video signal of the entire video image in the display-conversion component connected to the corresponding user display component;

transmitting said summary video signal to a user display component, chosen from said plurality of user display components;

forming the entire frame video image on the user display component, said user display component is connected to one of said display conversion components chosen from said plurality of intermediate conversion components;

perceiving the entire frame video image by at least one user;

determining eye characteristics of the user by employing at least one eye sensor in operative communication with one eye of the user, said eye characteristics are determined relatively to the entire frame video image formed by the user display component and perceived at an eye of said user, and by employing data from said sensor to dynamically establish coding characteristics, generating a plurality of display interrogation signals for one of said display components, said generating is provided in one of the first type computing components, said display interrogation signals provide coding said boundaries, taking into account an eye resolution and dynamic characteristics of the eyes of users of the corresponding user display component, said dynamic characteristics are determined in relation to the video image, and taking into account the characteristics of said predetermined quality levels;

said display interrogation signals containing information on the external boundaries of at least one area of the video image with one of the predetermined quality levels;

transmitting said display interrogation signals to one component of a plurality of computing component of a second type, connected to said group-user intermediate conversion component;

transmitting said display interrogations signals immediately to said user display-conversion component;

generating a plurality of group interrogation signals within the second type computing components; said group interrogation signals are generated based on the display interrogation signals of at least one computing component connected to a corresponding computing component of the second type;

calculating said external boundaries of the area video image within said second type computing components, in this connection, coding said external boundaries of said areas of an equal quality level for said users or said group of users, the external boundaries of each said quality level include the external boundaries of all said areas with the corresponding quality level;

wherein said changing of said boundaries is controlled by said group interrogation signals taken into account with a respective concurrent adjustment in converting said video signals;

said forming of the entire frame video image on the user display component, based on said area video signals, is controlled by said display interrogations signals; and subjected to said group interrogation signals containing at least information on the boundaries of said areas of the video image of any of said extended quality levels, at least one time changing the boundaries of the areas in at least one intermediate conversion component;

in this connection, the video signals of the second and higher numbers quality levels are converted in a display-conversional component connected with the user display component for every video signal.

10. The method of claim 9, wherein said users consist of two types of users: registered users and non-registered users; said transmitting the video signal of the lowest quality level is provided to the corresponding user display components of the registered and non-registered users.

11. The method of claim 9, wherein said forming the video signal of the entire video image or of said areas of the video image of a predetermined low quality level in the formation component further comprises: identifying a value of a pixel of the video image of said low quality level as the mean value of pixels values of a predetermined high quality level of the video image, wherein said pixels values forming a part of the video image area, restricted with the boundaries of said pixel of the predetermined low quality level.

12. The method of claim 9, further comprising the steps of:

determining a value of one of the pixels of the video signal of the extended quality level of the video image in the video signal formation component or in the video signal conversion component by subtraction of said value of a predetermined high quality level pixel of the video image from a value of the video signal pixel of the basic quality level; and forming a video signal pixel with a basic quality level in the video signal conversion component or in the information display component and a video signal pixel of the high quality level of the video image, by way of summing the video signal pixel of the extended quality level and the video signal pixel of the basic quality level.

13. The method of claim 9 wherein said method further comprises: a preliminary step of recording video signals of a predetermined lowest quality level, transmitting said video signals of a predetermined extended quality level to the user display components, and reading up said recorded video signals of the lowest quality level during the step of transmitting said video signals, thereby reducing the information volume to be transmitted.

14. A method of interactive television wherein a video signal is generated based on real time user perception of video images comprising the steps of:
  forming a video signal of an entire frame of a video image, and/or
  forming video signals of
    sectors of said video image with substantially equal quality levels and predetermined boundaries, or
    an entire frame of a video image with different quality levels, in a video signal formation component;
  converting the video signals at least one time in at least one
    video signal conversion component into a series of video signals of the video image sectors and/or
    converting the level of quality of the video image sectors, and/or
  changing said predetermined boundaries of said sectors,
  transmitting said video signals via data channels, at least, to one said conversion component and to at least one display component,
  forming a video image the display component, said video image being perceived, at least, by one user,
  determining eye characteristics by employing at least one sensor in operative communication with one eye of the user, said characteristics are defined relatively to the video image formed by the user display component and perceived at an eye of said user, and by employing data from said sensor to dynamically establish signal coding characteristics,
    transmitting said signals having said coding characteristics to at least one computing component;
  generating interrogation signals with said computing component, taking into account the eye resolution, communicated in the coding characteristics, said interrogation signals include a first category containing information on the boundaries of at least one sector of the video image and/or a second category containing information on the quality levels of at least one sector of the video image;
  transmitting said interrogation signals to at least components of the following types: said formation component, said conversion component, and said display component;
wherein:
  the interrogation signals are taken into account with a respective concurrent adjustment in forming of said video signals, converting said video signals, and forming said image;
  said forming video signals is provided for said different quality levels, and further comprises:
    transmitting said video signals via data channels, at least, to one said conversion component,
    subjected to said first category interrogation signals, changing the boundaries of each sector of the video image in the conversion component except for the sector of the highest quality level, said boundaries including internal and external boundaries, the internal boundaries of all the sectors, except the highest quality level sector, correspond to the external boundaries of the video signal with the next higher quality level;
  said converting a video signal of the entire video image is provided into a series of video signals of the entire video image with different quality levels;
  said different quality levels include a number of quality levels starting from a lowest quality level; said method further comprises: a preliminary step of recording video signals of an entire frame of a video image of the lowest quality level, transmitting said recorded video signals except for the highest quality level video signals, and said recorded video signals of the lowest quality level are read up during the step of transmitting said video signals, thereby reducing the information volume to be transmitted.

* * * * *